US007136505B2

(12) United States Patent
Wenzel et al.

(10) Patent No.: US 7,136,505 B2
(45) Date of Patent: Nov. 14, 2006

(54) GENERATING A CURVE MATCHING MAPPING OPERATOR BY ANALYZING OBJECTS OF INTEREST AND BACKGROUND INFORMATION

(75) Inventors: Lothar Wenzel, Round Rock, TX (US); Ram Rajagopal, Austin, TX (US); Satish V. Kumar, Austin, TX (US); Darren R. Schmidt, Cedar Park, TX (US); Kevin M. Crotty, Austin, TX (US); Matthew S. Fisher, Austin, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 740 days.

(21) Appl. No.: 10/264,059

(22) Filed: Oct. 3, 2002

(65) Prior Publication Data

US 2003/0194134 A1 Oct. 16, 2003

Related U.S. Application Data

(60) Provisional application No. 60/371,474, filed on Apr. 10, 2002.

(51) Int. Cl.
*G06K 9/00* (2006.01)

(52) U.S. Cl. ...................... 382/103; 382/173
(58) Field of Classification Search ................ 382/103
See application file for complete search history.

(56) References Cited

U.S. PATENT DOCUMENTS 4,630,203 A * 12/1986 Szirtes ....................... 382/132

| 5,933,523 | A | 8/1999 | Drisko et al. |
| 6,035,066 | A | 3/2000 | Michael |
| 6,072,889 | A * | 6/2000 | Deaett et al. ............. 382/103 |
| 6,240,218 | B1 | 5/2001 | Michael et al. |
| 6,288,703 | B1 * | 9/2001 | Berman et al. ............. 345/600 |
| 6,324,299 | B1 | 11/2001 | Sarachik et al. |
| 6,381,366 | B1 | 4/2002 | Taycher et al. |

(Continued)

OTHER PUBLICATIONS

IMAQ™ "IMAQ Vision Concepts Manual," Oct. 2000, pp. 14-18 through 14-25.

(Continued)

*Primary Examiner*—Joseph Mancuso
*Assistant Examiner*—Damon Conover
(74) *Attorney, Agent, or Firm*—Meyertons Hood Kivlin Kowert & Goetzel, P.C.; Jeffrey C. Hood; Mark S. Williams

(57) ABSTRACT

System and method for determining a mapping operator for use in a pattern matching application, where the mapping operator enhances differences between respective objects of interest and background objects, e.g., objects not of interest. First and second information is received regarding an object of interest and objects that may appear with the object of interest in an acquired target data set, respectively. The mapping operator is determined using the first information and the second information by determining a template discrete curve characterizing the object of interest, determining one or more target discrete curves characterizing the background objects, and generating a mapping operator that enhances differences between the mapped template discrete curve and the mapped target discrete curves. The operator is stored in a memory and is operable to be used in a pattern matching application to locate instances of the object of interest in acquired target data sets or images.

52 Claims, 18 Drawing Sheets

U.S. PATENT DOCUMENTS

| | | | |
|---|---|---|---|
| 6,411,734 | B1 | 6/2002 | Bachelder et al. |
| 6,421,458 | B1 | 7/2002 | Michael et al. |
| 6,570,608 | B1 * | 5/2003 | Tserng .................. 348/143 |
| 6,661,918 | B1 * | 12/2003 | Gordon et al. ............ 382/173 |
| 6,687,402 | B1 * | 2/2004 | Taycher et al. ........... 382/199 |
| 6,694,057 | B1 * | 2/2004 | Miller et al. ............. 382/203 |
| 2001/0005219 | A1 * | 6/2001 | Matsuo et al. ............ 348/169 |

OTHER PUBLICATIONS

Wenzel, Lothar, "Efficient Matching of Discrete Curves," National Instruments, Austin, Texas, Aug. 15, 2002, 21 pages.

"Numerical Recipes in Fortran 77: The Art of Scientific Computing" (ISBN 0-521-43064-X), Cambridge University Press, pp. 299-306 Copyright 1986-1992.

"State-of-the-Art in Shape Matching", by Remco C. Veltkamp and Michiel Hagedoorn, Utrecht University, Department of Computing Science, The Netherlands, 1999, pp. 1-26.

Loncaric, S. 1998. "A Survey of Shape Analysis Techniques", pp. 1-45. (See note under #5 in coversheet).

Alt, H. and Guibas L.J. Discrete Geometric Shapes: Matching, Interpolation, and Approximation, Dec. 3, 1996, pp. 1-34. (See note under #5 in coversheet).

* cited by examiner

Pattern Matching

Pattern Matching With Characterization Of The Template Image

Computer System

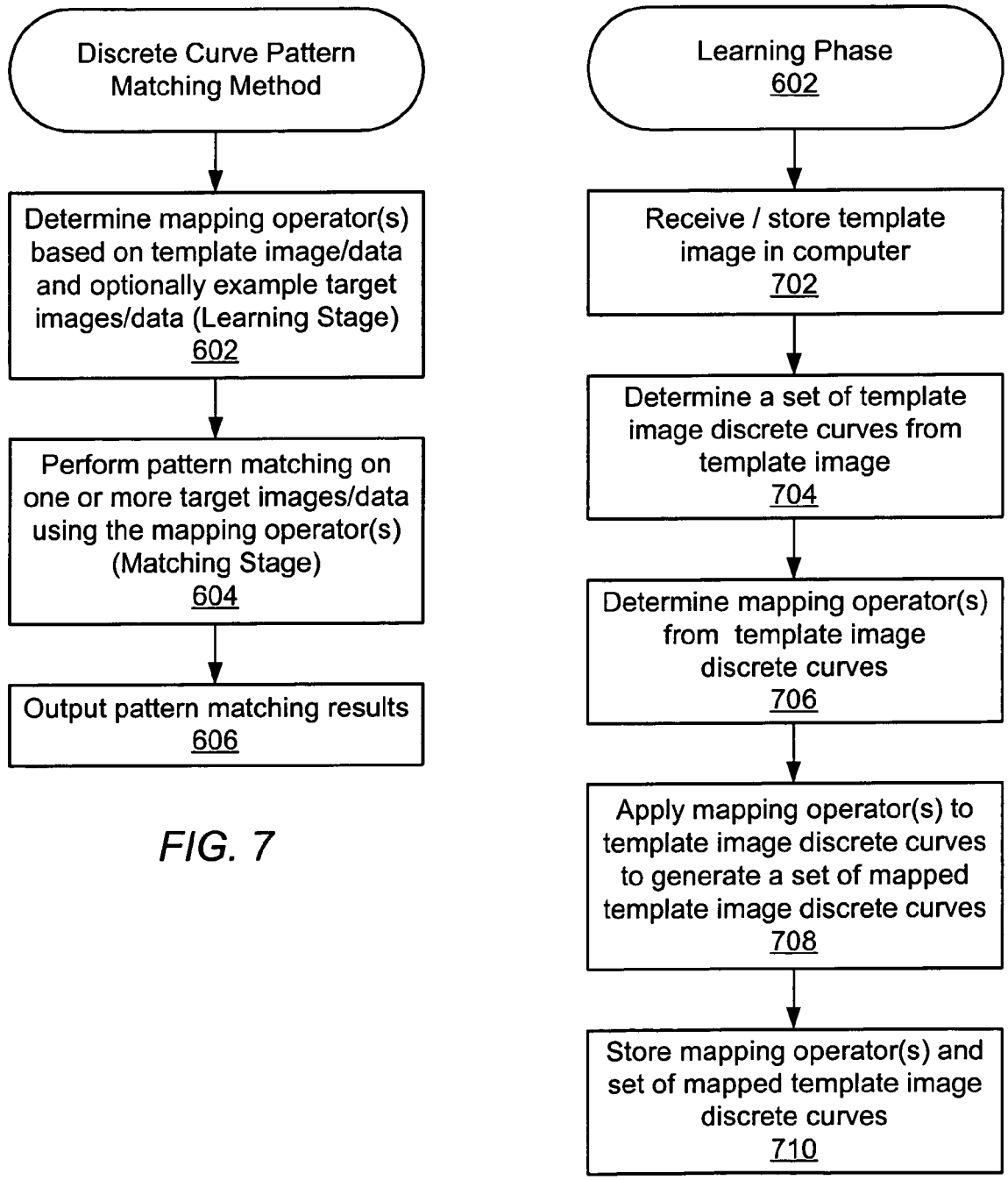

GENERATING A CURVE MATCHING MAPPING OPERATOR BY ANALYZING OBJECTS OF INTEREST AND BACKGROUND INFORMATION

PRIORITY DATA

This application claims benefit of priority of U.S. Provisional Application Ser. No. 60/371,474 titled "Pattern Matching System Utilizing Discrete Curve Matching with a Mapping Operator", filed Apr. 10, 2002.

FIELD OF THE INVENTION

The present invention relates to a system and method for determining a mapping operator based on analysis of objects of interest and background information, e.g., in data sets or images. The mapping operator may then be used to determine the presence of an object of interest, e.g., a template discrete curve, in one or more target data sets or images.

DESCRIPTION OF THE RELATED ART

In many applications it is necessary or desired to determine the presence of an object of interest in a data set, such as a target image. For example, in many image processing applications it is desirable to find one or more matches of a template image in a larger target image. Exemplary machine vision applications include process monitoring, feedback control, and laboratory automation; image and video compression; and jitter compensation in video cameras, among others. Various characteristics may be used in classifying a location in the target image as a match, including luminance pattern information, color pattern information, and color information.

Additionally, the object of interest in the target image may be transformed relative to the known object information, e.g., in the template image. For example, the object of interest in the target image may be shifted, scaled, rotated, or may have other geometric or topological transformations.

Prior art pattern recognition systems have typically used a template matching technique wherein the stored image or pattern to be located is iteratively compared with various portions of a target image in which it is desired to locate the template. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels, e.g., the grayscale value associated with the pixels, in the template image, or a selected subset of sample pixels, against each of the possible various locations in the target image.

Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching may produce the location of the match in the image, the quality of match and possibly the orientation, size and/or scaling of the match.

The template is typically compared with portions of the target image by utilizing a correlation based pattern matching, i.e., using normalized two dimensional correlation (normalized 2D correlation). This 2D correlation is performed by placing the template over the respective portion of the image and performing a complete normalized 2D correlation between the pixels in the template and the pixels in the corresponding portion of the image, using vanes associated with the pixels, such as grayscale values. This correlation generally produces a correlation value which indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

The normalized 2D correlation operation is based on a point-wise multiplication wherein the template is first conceptually placed over a portion of the image, the value associated with each point or pixel of the template is multiplied with the corresponding pixel value in the respective portion of the target image, and the result is summed over the entire template. Also, as noted above, the template image is generally compared with each possible portion of the target image in an iterative fashion. This approach is thus very computationally intensive.

Various optimizations or algorithms have been developed to provide a more efficient pattern matching technique. One prior art technique is to use selected samples or pixels from the template image, referred to as sample pixels, to represent the template image and hence to reduce the number of computations in the correlation.

FIG. 2 illustrates the pattern matching process of the prior art which involves characterization of the template with a reduced number of sample pixels. In this process, a characterization of the template is performed to extract features from the template image. In other words, the template is characterized to represent the template image with a lesser number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

Another prior art technique for performing pattern matching utilizes hue plane or color information, either alone or in combination with pattern matching. Utilizing color information can often be used to simplify a grayscale pattern matching problem, e.g., due to improved contrast or separation of an object from the background. Also, some applications may utilize color information alone, i.e., not in conjunction with pattern information, to locate target image matches, e.g., for cases when an application depends on the cumulative color information in a region and not how the colors are arranged within the region or the spatial orientation of the region.

In machine vision applications, color is a powerful descriptor that often simplifies object identification and extraction from a scene. Color characterization, location, and comparison is an important part of machine vision and is used in a large class of assembly and packaging inspection applications. Inspection involves verifying that the correct components are present in the correct locations. For example, color information may be used in inspecting printed circuit boards containing a variety of components; including diodes, resistors, integrated circuits, and capacitors. These components are usually placed on a circuit board using automatic equipment, and a machine vision system is useful to verify that all components have been placed in the appropriate positions.

As another example, color information is widely used in the automotive industry to verify the presence of correct components in automotive assemblies. Components in these assemblies are very often multicolored. For example, color characterization may be used to characterize and inspect fuses in junction boxes, i.e., to determine whether all fuses are present and in the correct locations. As another example, it is often necessary to match a fabric in one part of a multi-color automobile interior. A color characterization method may be used to determine which of several fabrics is being used.

Another prior art technique for performing pattern matching is referred to as geometric pattern matching, which may also be referred to as curve matching or shape matching. Geometric pattern matching generally refers to the detection and use of geometric features in an image, such as boundaries, edges, lines, etc., to locate geometrically defined objects in the image. The geometric features in an image may be reflected in various components of the image data, including, for example, luminance (gray-scale intensity), hue (color), and/or saturation. Typically, geometric features are defined by boundaries where image data changes, e.g., where two differently colored regions abut. Geometric pattern matching techniques are often required to detect an object regardless of scaling, translation, and/or rotation of the object with respect to the template image. For further information on shape or geometric pattern matching, see "State-of-the-Art in Shape Matching" by Remco C. Veltkamp and Michiel Hagedoorn (1999), and "A Survey of Shape Analysis Techniques" by Sven Loncaric, which are both incorporated herein by reference.

An issue that arises in many pattern matching applications is that the target image being analyzed may contain other objects besides the object of interest, i.e., the template image. The presence of these other objects may complicate the pattern matching process, in that the other objects may differ from the template image to various degrees, with some of the objects being fairly similar, and others being quite different from the template image. For a simplified example, assume an application where the template image is a square, and the target image contains a square, two rectangles, and a circle. To reliably match/detect the square in the target image, a pattern matching technique must not only distinguish between the square and the circle, but also between the square and each of the rectangles. However, in many cases, a pattern matching algorithm which successfully distinguishes a square from a circle may not reliably distinguish a square from a rectangle. Conversely, a pattern matching algorithm which successfully distinguishes a square from a rectangle may not reliably distinguish a square from a circle. Thus, when the target image presents a complex scene, the task of distinguishing between the object of interest and objects not of interest may become difficult. This issue becomes increasingly important when pattern matching is performed with 'real world' image data, i.e., when the target image is not preprocessed to facilitate pattern matching with the particular pattern matching algorithm used.

Therefore, an improved system and method is desired for determining the presence of an object of interest in a data set. For example, in an image pattern matching application, an improved system and method is desired for determining the presence of an object of interest in a target image. In addition, an improved system and method is also desired which can determine the presence of an object of interest in a target image despite various types of topological transformations of the object of interest in the target image relative to the "template" object of interest. More specifically, it would be desirable to determine the presence of an object of interest in a target image despite various types of linear and non-linear transformations of the object in the target image. Additionally, improved methods are desired for preparing discrete curves for comparison, e.g., for a curve matching application.

SUMMARY OF THE INVENTION

One embodiment of the present invention comprises a system and method for locating regions in a target image that match, at least to a degree, a template image with respect to pattern information. A template image comprising a plurality of pixels may be received by a computer system. A method to characterize pattern information of the template image may be performed.

When a target image is received, e.g., when the target image is acquired by a camera for a machine vision application, the target image may then be searched in order to find one or more regions in the target image matching the pattern information of the template image, referred to as an object of interest. The pattern information may comprise luminance pattern information and/or hue plane pattern information, and may also comprise saturation plane pattern information.

In one embodiment, the object of interest may comprise a template image, or may be included in a template image. First, a mapping operator may be determined, e.g., from the template image and/or one or more sample target images. The mapping operator may be applicable to the template image and to one or more target images to map discrete curves representing image objects in the respective images to a form or space which enhances or amplifies differences between the object of interest and objects not of interest. This step may be considered a learning stage of the process, in that the mapping operator may be determined based on one or both of the template image and the type of target images to be analyzed. For example, in one embodiment, the template image (i.e., the object of interest) may be analyzed, and the mapping operator determined and/or configured such that the object of interest may be effectively distinguished from other objects, e.g., "background objects" or objects not of interest. In one embodiment, the template image itself may include both the object of interest and one or more background objects. The mapping operator may be configured to discriminate effectively between the object of interest and the one or more background objects. In another embodiment, one or more representative target images which include one or more background objects may be analyzed along with the template image to configure the mapping operator for effective discrimination between the object of interest and the background object(s). The determined mapping operator may then be stored for use in a matching stage of a pattern matching process. In one embodiment, the mapping operator may be applied to objects or curves detected in the template image and the resulting mapped curves stored for use in the matching stage.

Thus, in various embodiments, the method operates to determine one or more mapping operators from a plurality of discrete curves that enhance differences between a discrete curve corresponding to an object of interest, and one or more discrete curves corresponding to objects that are not of interest.

BRIEF DESCRIPTION OF THE DRAWINGS

A better understanding of the present invention can be obtained when the following detailed description of the preferred embodiment is considered in conjunction with the following drawings, in which:

FIG. 7 is a flowchart diagram illustrating one embodiment of a method for locating regions of a target image that match a template image;

FIG. 7A is a flowchart diagram illustrating one embodiment of the learning phase of the method of FIG. 7;

Figure 1:
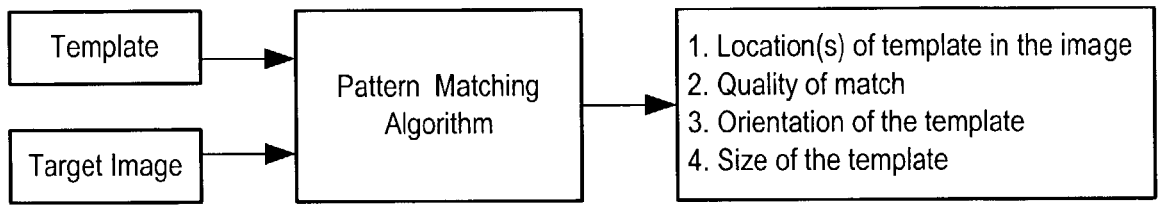
FIG. 1 illustrates pattern matching as performed in prior art.
Figure 2:
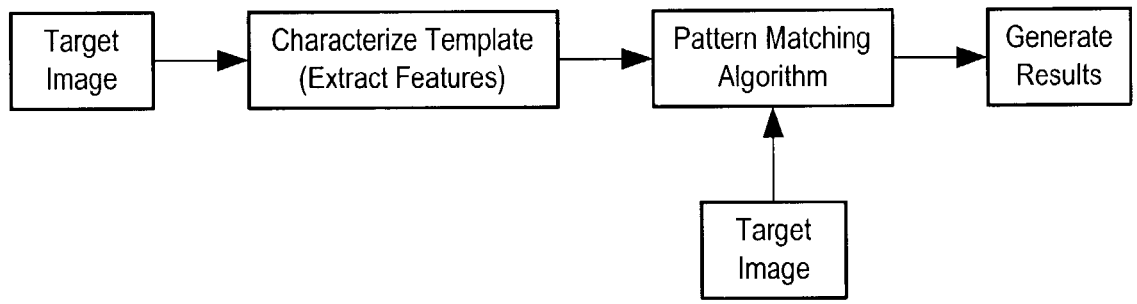
FIG. 2 illustrates pattern matching performed in prior art, which includes characterization of the template image with fewer pixels for reduced computation.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE EMBODIMENTS

Incorporation by Reference

The following patent applications are hereby incorporated by reference in their entirety as though fully and completely set forth herein:

U.S. patent application Ser. No. 09/227,506 titled "Pattern Matching System and Method Which Performs Local Stability Analysis for Improved Efficiency" filed on Jan. 6, 1999, whose inventors are Dinesh Nair, Lothar Wenzel, Nicolas Vazquez, and Samson DeKey; and U.S. Provisional Application Ser. No. 60/371,474 titled "Pattern Matching System Utilizing Discrete Curve Matching with a Mapping Operator", filed Apr. 10, 2002.

The following publications are hereby incorporated by reference in their entirety as though fully and completely set forth herein:

The National Instruments IMAQ™ IMAQ Vision Concepts Manual; and

"Efficient Matching Of Discrete Curves", by Lothar Wenzel, National Instruments, Austin, Tex.

Figure 3:
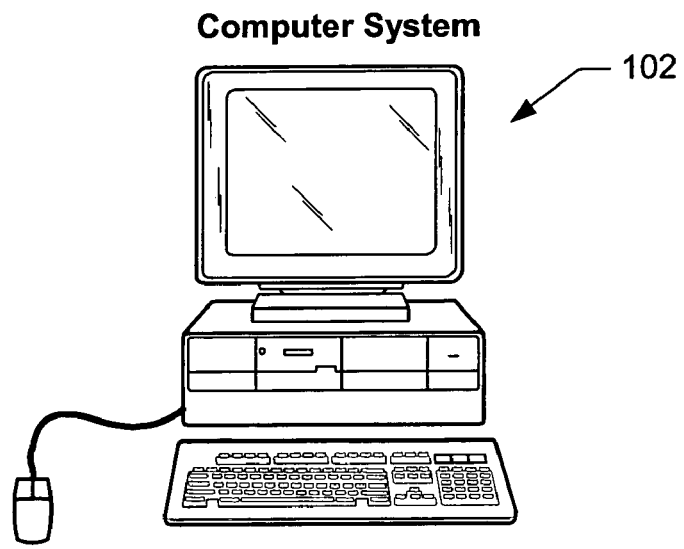
FIG. 3 illustrates a computer system suitable for performing pattern matching according to one embodiment of the present invention.

FIG. 3—Computer System

FIG. 3 illustrates a computer system 102 which may perform pattern match location according to one embodiment of the present invention. The computer system 102 may comprise one or more processors, a memory medium, display, and an input device or mechanism, such as a keyboard or mouse, and any other components necessary for a computer system.

The computer system 102 may perform a pattern characterization method of a template image and may use information determined in this analysis to determine whether a target image matches the template image and/or to locate regions of the target image which match the template image, with respect to pattern information. Images that are to be matched are preferably stored in the computer memory and/or received by the computer from an external device.

The computer system 102 preferably includes one or more software programs operable to perform the pattern match determination and/or location. The software programs may be stored in a memory medium of the computer system 102. The term "memory medium" is intended to include various types of memory, including an installation medium, e.g., a CD-ROM, or floppy disks, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing pattern match location according to the methods or flowcharts described below.

Figure 4:
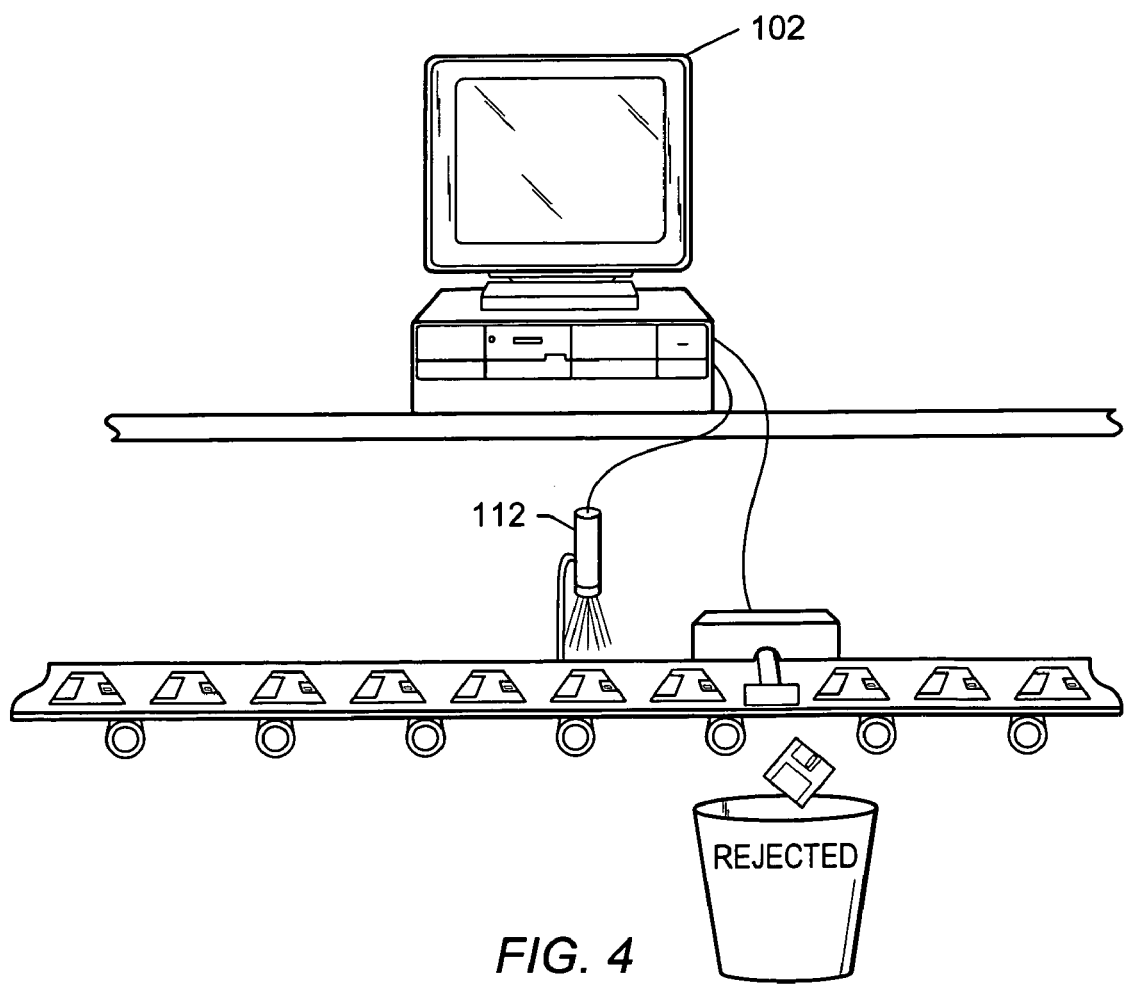
FIG. 4 illustrates an image acquisition (video capture) system for acquiring images.

FIG. 4—Machine Vision System

FIG. 4 illustrates a machine vision system or image acquisition system, which is an example of one application of the present invention. The pattern match determination/location techniques described herein may be used in various types of machine vision or motion control applications. For example, the computer 102 may be embodied in various form factors and/or architectures, e.g., a robot or embedded device, among others. It is also noted that the pattern match location techniques described herein may be performed in any of various manners, either in software, programmable logic, or hardware, or a combination thereof.

In the machine vision system of FIG. 4, computer system 102 is coupled to a camera 112 and operates to receive one or more images. The computer system 102 may be operable to perform a pattern characterization method to determine pattern information of the template image. In the present application, the term "template image" is used to rear to either an entire image, or a portion of an image, e.g., a region of interest (ROI). The computer system 102 may also be operable to perform a search of a target image to locate target image regions that match the pattern information of the template image. As described below, the search may be performed to locate matching regions with any of various degrees of exactness, as appropriate for a particular application.

Figure 5:
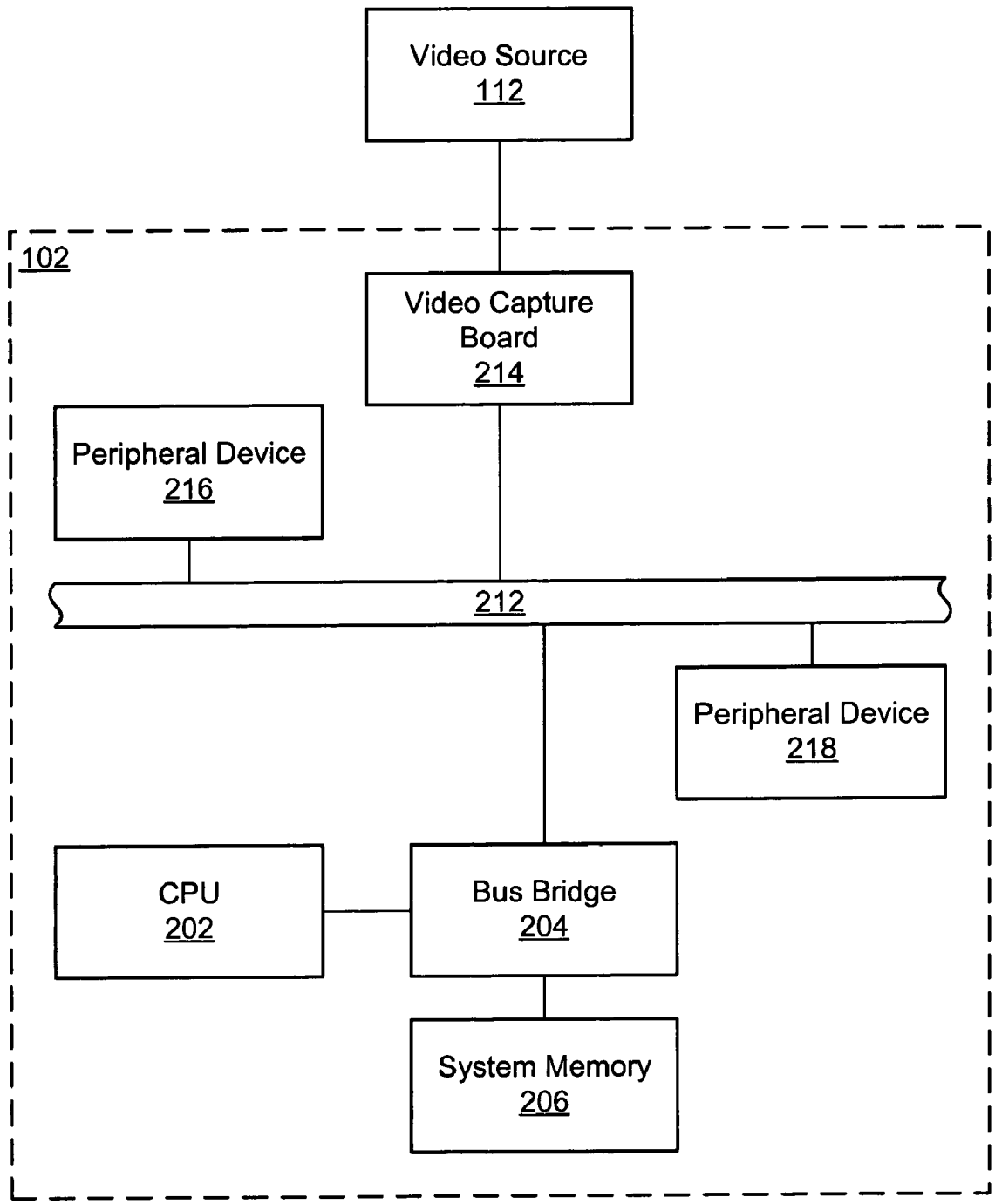
FIG. 5 is a high-level block diagram of the image acquisition system.

FIG. 5—Image Acquisition System Block Diagram

FIG. 5 is a high-level block diagram of the image acquisition system of FIG. 4 for acquiring an image for pattern matching according to one embodiment of the present invention. It is noted that the block diagram of FIG. 5 is exemplary only, and other computer system architectures may be used as desired. For example, the present invention may be implemented in a "smart camera", which integrates a sensor, analog to digital (A/D) converter, CPU, and communications devices together in a single unit. The present invention may be embodied in other architectures, devices, or embodiments, as desired.

As shown in FIG. 5, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. One or more regions of interest (ROI) may be specified in the target image which are desired to be searched for regions having pattern information that matches the pattern information of a template image, or the entire target image may be searched.

The system memory 206 may store a template image. The system memory 206 may also receive and/or store one or more other images, such as selected regions of interest (ROIs) in the template image or another image, or acquired target images. The system memory 206 also preferably stores software according to the present invention which operates to analyze the pattern information of the template and target images. The software may also be executable to perform various pattern match location methods, as described below. The system memory 206 may store the pattern information of the template image for comparison to various regions in the target image during the pattern match location process.

The term "image," as used herein, may refer to any of various types of images. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, framegrabber, scanner, etc. An image may be a complex image, in which pixel values (positions) have a real part and an imaginary part.

It is noted that, in a pattern match application, the pattern information of the template image may be pre-calculated and stored in the computer, and the actual template image is then not required to be stored or used for subsequent pattern match determination/location operations with respective target images. Thus, when a target image is acquired, the software may compare the pattern information of the target image with the pre-computed pattern information of the template image.

The present invention is preferably implemented in one or more software programs which are executable by a processor or CPU. The software program(s) of the present invention are preferably stored in a memory medium of a computer as described above.

Although many of the embodiments described herein relate to images and image processing, it is noted that the techniques described are broadly applicable to data sets and data processing. In other words, various embodiments of the invention may be used to perform discrete curve matching where the discrete curves are determined from data as opposed to images.

Certain concepts related to Sturm-Liouville Theory and curve matching may be useful in understanding various embodiments of the present invention, and thus are presented below.

Sturm-Liouville Theory

The Sturm-Liouville theory is a well-established mathematical topic with numerous applications in science and engineering (e.g. Chirikjian and Kyatkin [2001]). Some results and methods of this theory are presented below. It should be noted that for brevity, the most general version of the theory is not presented.

Let $s(x)$, $w(x)$, and $q(x)$ be real-valued differentiable functions on the real finite and closed interval $[a,b]$, where $s(x)$ and $w(x)$ are positive functions on the given interval. The solutions of differential equation:

$$\frac{d}{dx}\left(s(x)\frac{dy}{dx}\right) + (\lambda W(x) - q(x))y = 0 \quad (1)$$

in the unknown function y for different eigenvalues $\lambda$ and appropriate boundary conditions generate sets of orthogonal eigenfunctions $y(x)$. It has been shown (Birkhoff and Rota [1960]) that the eigenfunctions of Sturm-Liouville differential equations (1) form a complete set of functions in $L^2([a,b],R)$. Perhaps the most familiar situation is $s(x)=1$, $w(x)=1$, and $q(x)=0$, $[a,b]=[0,2\pi]$, where the boundary conditions are $y(a)=y(b)$ and $y'(a)=y'(b)$. The differential equation (1) reduces to:

$$\frac{d^2 y}{dx^2} + \lambda y = 0 \quad (2)$$

$y(0) = y(2\pi)$ and $y'(0) = y'(2\pi)$

The eigenvalues and real-valued eigenfunctions are:

$\lambda=0$ and $y(x)=1$ $\lambda=n^2$ and $y(x)=\sin(nx)$, $y(x)=\cos(nx)$ for $n=1,2,$ \quad (3)

Functions f in $L^2([a,b],R)$ can be represented in the $L^2$ sense by a series:

$$f(x) = \sum_{n=0}^{\infty} d_n y_n(x) \quad (4)$$

where $$d_n = \frac{\int_a^b dx f(x) y_n(x) w(x)}{\int_a^b dx y_n(x)^2 w(x)}$$

It is common to normalize functions $y_n(x)$, i.e. the denominator in (4) vanishes. The function w is called the weight function. Many of the resulting orthogonal function systems $\{y_n(x)\}$ satisfy three-term recurrence relations:

$$y_{n+1}(x)=C_1(x,n)y_n(x)+C_2(x,n)y_{n-1}(x) \quad (5)$$

Particularly, in the case when $\{y_n(x)\}$ is a set of polynomials, the functions $C_1$ and $C_2$ are of the form $C_1(x,k)=a_k x+ b_k$ and $C_2(x,k)=c_k$, respectively. All numbers a, b, and c depend only on k. It can be shown that the three-term recurrence relation:

$$p_n(x)=(a_n x+b_n)p_{n-1}(x)+c_n p_{n-2}(x) \quad (6)$$

generates all possible systems of orthogonal polynomials, where $p_{-1}(x) = 0$ \quad (7)

$p_0(x) = 1$ $$a_n = \frac{1}{(p_{n-1},p_{n-1})^{\frac{1}{2}}}, b_n = -\frac{(xp_{n-1},p_{n-1})}{(p_{n-1},p_{n-1})^{\frac{3}{2}}}, c_n = -\frac{(p_{n-1},p_{n-1})^{\frac{1}{2}}}{(p_{n-2},p_{n-2})^{\frac{1}{2}}}$$

$$(p,q) = \int_a^b p(x)q(x)w(x)dx$$

Let $p_k(x)$ be a complete system of orthonormal polynomials over $[-1,1]$, where $w(x)$ is a non-negative weight function used to define the scalar product in this space. Let $x_0, x_1, \ldots, x_n$ be the roots of $p_{n+1}$, and let $w_0, w_1, \ldots, w_n w_0$ be the solution of (Gaussian quadrature):

$$\sum_{j=0}^{n} x_j^k w_j = \int_{-1}^{1} x^k w(x) dx \text{ for } k = 0, \ldots, n \quad (8)$$

It can be shown that $$\sum_{j=0}^{n} f(x_j) w_j = \int_{-1}^{1} f(x) w(x) dx \quad (9)$$

for any polynomial of order not exceeding $2n+1$. In particular, $$\sum_{k=0}^{n} p_t(x_k) p_j(x_k) w_j = \int_{-1}^{1} p_t(x_k) p_j(x_k) w(x) dx = \delta_{ij} \text{ for } j, k \leq n \quad (10)$$

Gaussian quadrature provides tools that translate continuous orthonormality relations into discrete ones. Equation

(10) can be interpreted as follows. The zeros of such an orthonormal polynomial (basis function) may be used to efficiently sample curves, as described below with reference to FIG. 6A.

Shape Based Geometrical Description

Shape analysis has many applications in engineering, biology, chemistry, geography, medicine, and imagine processing. General shape spaces are well understood, e.g. Kendall et al. [1999], Kendall [1977, 1984], Came [1990]. Such spaces are based on specific sets of transformation groups G that lead to Riemannian metrics and Lie group theoretical approaches. An example is Kendall's shape space $$\sum_{m}^{k}$$

of k points in an m-dimensional Euclidean space where the group G of transformations consists of translation, rotation, and scaling. A suitable distance in $$\sum_{m}^{k}$$

is the Riemannian metric ρ. This metric can be defined as follows. Let $A_P$ and $B_P$ be so-called preshapes of two configurations A and B. A and B are point sets of same size k in $R^m$. Preshapes are normalized versions of the original shape (centered at 0 and Euclidean norm 1). The Riemannian metric ρ in shape space is defined as ρ(A,B)=arc cos{trace(Λ)} where the matrix Λ is the diagonal m by m matrix with positive elements given by square roots of the eigenvalues of $A_P^T B_P B_P^T A_P$, except the smallest diagonal element which is negative if det($B_P^T A_P$)<0. Related distances are full and partial Procrustes distances (see e.g. Kent [1992]). The term 'full' stands for minimization over the full set of similarity transforms and the term 'partial' stands for minimization only for translation and rotation.

The special case of shapes in $R^2$ can be interpreted as the study of point sets in the complex plane, C. In doing so it can be shown that the full and partial Procrustes distances in Kendall's shape space for point in $R^2$ can be obtained as the solution to complex linear regression problems of the form:

$$B = rAe^{i\alpha} + 1_k c + E$$

where c is the complex location, r is the scale, α the angle of rotation. After centering and rescaling A and B as before symmetric measures of residual discrepancy can be derived.

$$d_{full}^2 = 1 - A^* BB^* A \quad (11)$$

$$d_{partial}^2 = 2(1 - \|A^*\|)$$

The former distance will be used in this paper to develop robust and efficient geometric pattern matching algorithms based on shapes.

In general, matching of shapes in higher dimensional spaces $R^m$ cannot be cast as a problem in linear regression. After pre-shaping two given configurations A and B (centered at 0 and Euclidean norm 1) symmetric residual discrepancy measures are:

$$d_{m,full}^2 = 1 - \text{trace}(\Lambda)^2 \quad (12)$$

$$d_{m,partial}^2 = 2(1 - \text{trace}(\Lambda))$$

where $$A_p^T B_p = V \Lambda U^T$$

is the singular value decomposition.

There are generalizations of distances to affine spaces and k-tuplets in a differentiable Riemannian manifold where G is a Lie group.

Optimal Discrete Open Curve Descriptors

Depending on the group of transformation, numerous open curve descriptors can be developed, including shift and scale invariant, shift, scale, and rotation invariant curve descriptors, as described below. In general, curve descriptors may be determined which may provide effective means for performing shape/pattern matching between discrete curves representing image objects in acquired images, as described below with reference to FIGS. 6–13B.

Shift and Scale Invariance

Given a set $S = \{c_1, \ldots, c_M\}$ of M discrete open and oriented curves in the plane, where all curves consist of exactly N discrete points. It is assumed that all curves are equally sampled, i.e. the distance between two adjacent points of a given curve is constant. The goal is the construction of a similarity measure that reflects the fact that all these curves are perpendicular to each other in a space of discrete open curves, where shift and scale invariance is achieved. To this end, a non-negative weight vector $w = w_1, \ldots, w_N$ may be generated that minimizes (in a certain sense) deviations from the orthonormality property of all curves in S.

Curves $c_i$ (i=1, ..., M) can be regarded as point sets in the complex plane C. Because of the desired shift and scale invariance a normalization procedure (mean value equal to zero, sum of lengths of all complex numbers in $c_i$ is equal to 1) is quite natural. Let all curves in $S = \{c_1, \ldots, c_M\}$ be normalized in the described sense. The desired orthonormality property results in a linear system:

$$\langle c_n, c_m \rangle_w = \sum_{i=1}^{N} c_{ni} c_{mi}^* w_i = \delta_{nm} \quad (13)$$

where the unknowns $w_1, \ldots, w_N$ are non-negative real numbers (the weight vector). If (13) is replaced with the matrix notation Cw=d, it follows that $$(C^T)^* Cw = (C^T)^* d \quad (14)$$

Both the matrix on the left side and the vector on the right are real-valued. Thus, expression (13) may provide a set of equations with which each $W_m$ may be solved. In practical applications, usually the system (13) is highly over-determined. Note that there are many more equations than terms in w, thus the system of equations comprises an over-determined linear system which may be solved via Single Value Decomposition. Standard methods can be applied to generate the best solution in the mean-squared sense in a numerically stable and fast manner.

Because of the special structure of (13), typically, many components of the unknown vector w are positive. Even if this were not the case, the computed weight vector w could be used to determine distances between given curves, where these curves are variations of S. To take advantage of the Sturm-Liouville theory, it must be guaranteed that all components of w are non-negative. In other words, linear systems with constraints such as:

w>0 or upper≧w≧lower≧0 in conjunction with (14) must be solved. Efficient algorithms for this class of problems exist, e.g. Active Set Method or Hildreth-d'Esopo Algorithm (e.g. Bronshtein and Semendyayev [1997]).

Figure 6A:
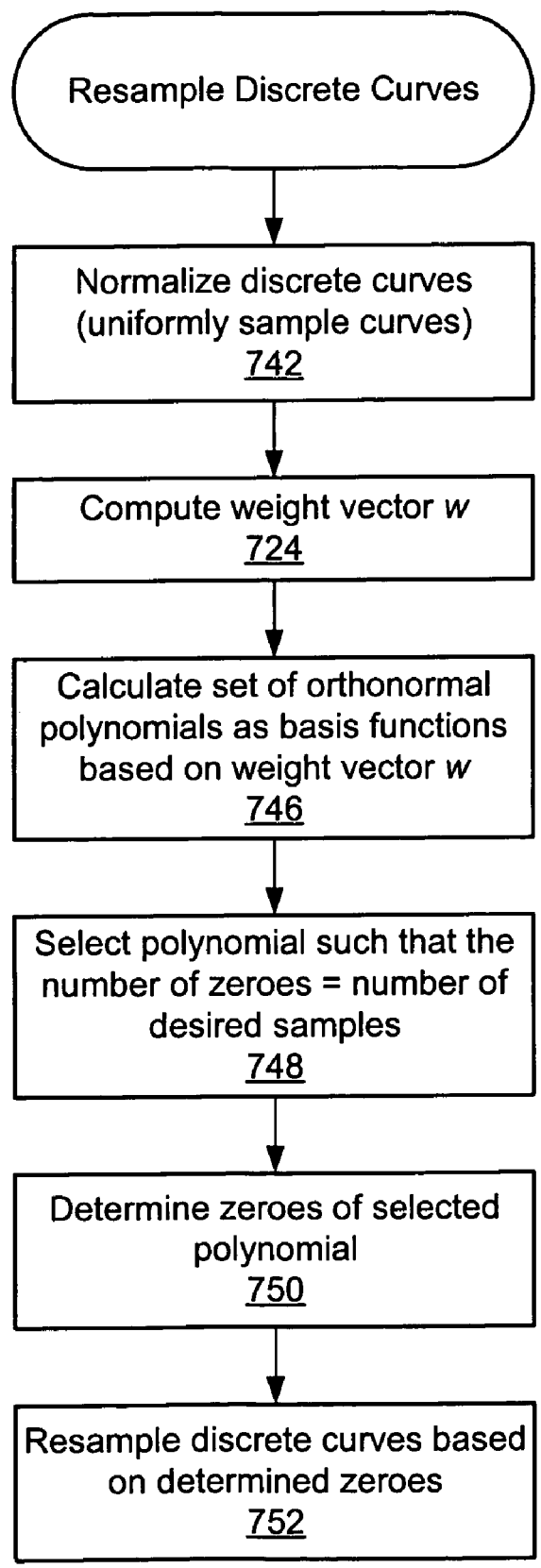
FIG. 6A is a flowchart diagram illustrating one embodiment of a method for re-sampling discrete curves.
Figure 6B:
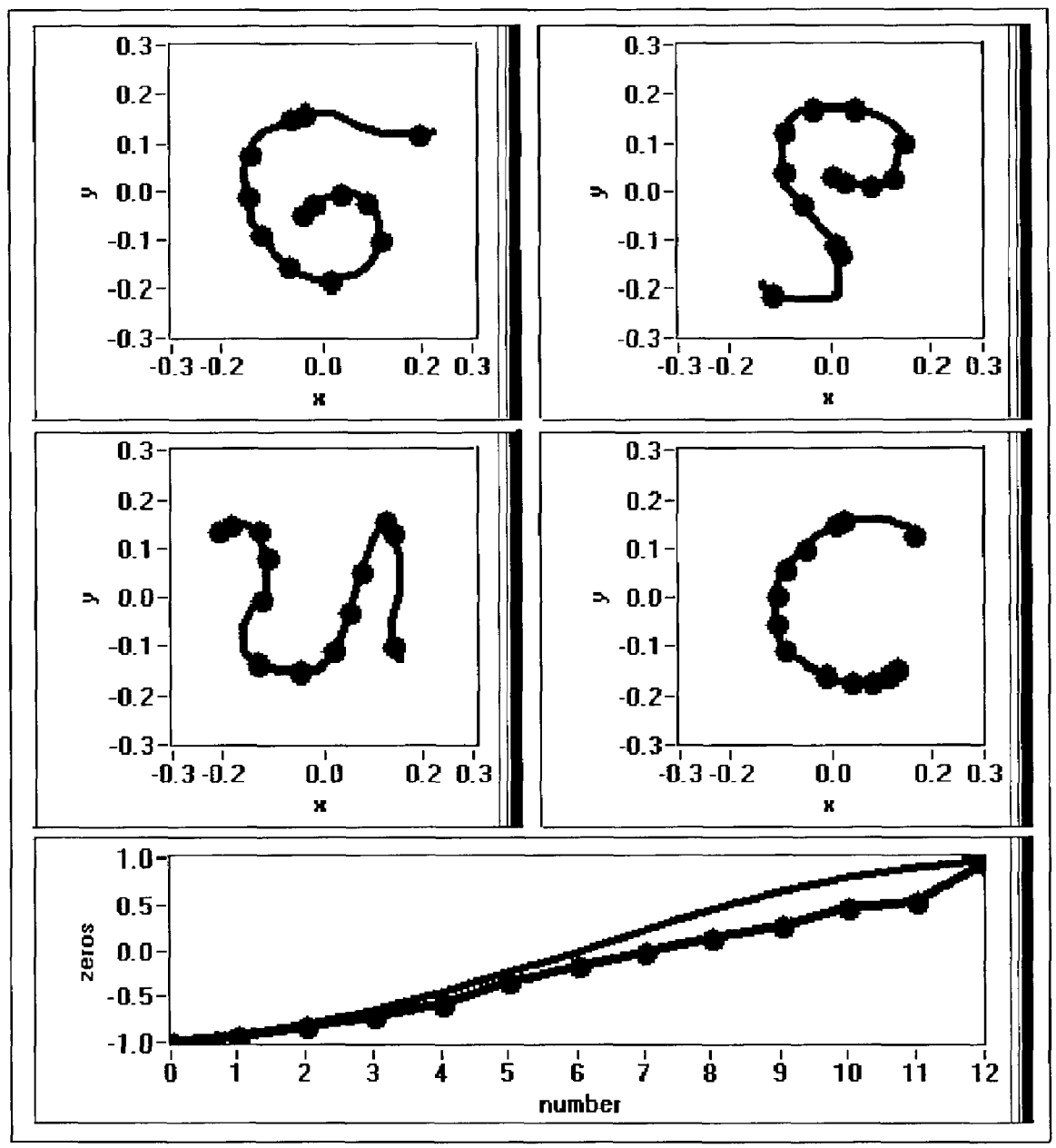
FIG. 6B illustrates example results of the method of FIG. 6A.

FIGS. 6A–6B—Re-Sampling of Discrete Curves

In a certain sense, a non-negative weight function w, as described above, may describe a given set of open curves in an efficient way. According to equations (5) and (6), the derived weight function w can be used to construct a set of orthonormal polynomials where w is the weight function underlying the definition of a scalar product. Based on this, the corresponding Gaussian quadrature can be derived. The latter can be regarded (via calculation of the roots of specific polynomials of the aforementioned set of orthonormal functions) as an efficient resampling strategy for all given discrete open curves. FIGS. 6A and 6B describe one embodiment of the above described discrete curve re-sampling technique.

FIG. 6A—Method for Re-Sampling Discrete Curves

In a certain sense, a non-negative weight function w, as described above, may describe a given set of open curves in an efficient way. According to equations (5) and (6), the derived weight function w can be used to construct a set of orthonormal polynomials where w is the weight function underlying the definition of a scalar product. Based on this, the corresponding Gaussian quadrature can be derived. The latter can be regarded (via calculation of the roots of specific polynomials of the aformentioned set of orthonormal functions) as an efficient resampling strategy for all given discrete open curves.

FIG. 6A flowcharts one embodiment of a method for efficiently sampling (re-sampling) discrete curves. As noted above, in various embodiments, some of the steps may be performed in a different order than shown, or may be omitted. Additional steps may also be performed.

As FIG. 6A shows, in 742, each of a set of discrete curves, $c_1, \ldots, c_M$, may be normalized. For example, the curves may be normalized in accordance with the method described below with reference to FIG. 7D, although it is noted that any other normalization scheme may also be used. In one embodiment, as part of the normalization process, each discrete curve may be uniformly sampled, as described below with reference to FIG. 7D. In a preferred embodiment, each (normalized) discrete curve has the same number of points.

After all of the discrete curves have been normalized, then, in 724, the weight vector w may be computed based on the discrete curves. In one embodiment, the weight vector w may comprise a non-negative weight function w such that $<c_n, c_m>_w = \delta_{nm}$ is satisfied in the least-square sense for all n and m, as noted above in (15) and (16). In one embodiment, the weight vector may be operable to transform discrete curves into a form which emphasized or amplifies the differences between the discrete curves.

In 746, a set of orthonormal polynomials may be calculated based on the weight vector w. As described above in the section on Sturm-Liouville Theory, the set of polynomials may serve as basis functions for representing functions in $L^2([a,b],R)$, analogous to sine functions in Fourier Theory. In particular, the mapping operator w may be regarded as a weight function defined on [−1,1] from which the set of orthonormal polynomials may be calculated, as shown in (10). In other words, w may be regarded as a non-negative function defined on [−1,1] and equations (6) and (1) applied to construct a set of orthonormal polynomials representing w.

$$\sum_{k=0}^{n} p_i(x_k)p_j(x_k)w_j = \int_{-1}^{1} p_i(x_k)p_j(x_k)w(x)dx = \delta_{ij} \text{ for } j, k \leq n \quad (10)$$

As noted above, Gaussian quadrature provides tools which translate continuous orthonormality relations into discrete orthonormality relations suitable for discrete curve operations. It is noted that the set of polynomials includes polynomials of any (or all) orders.

In 748, a polynomial may be selected from the set of polynomials of 746. In one embodiment, the polynomial may be selected such that the number of zeros (i.e., the order) of the polynomial equals the number of samples or points desired in the re-sampled discrete curve. For example, if the re-sampled discrete curve is to be represented by 60 points, then a polynomial of order 60 may be selected from the set of polynomials.

In 750, the zeros of the selected polygon may be determined. In other words, the points are determined at which the polynomial function crosses the horizontal axis in the interval [−1,1]. The determined zero points on the interval [−1,1] indicate efficient sampling points along the discrete curve. In other words, the zero points provide an optimal sampling strategy for representing the discrete curve.

Finally, in 752, the discrete curves may be re-sampled according to the determined zero points. The zero points will tend to be clustered around regions of relative complexity of the discrete curve, such as curves or bends, while leaving straight, i.e., simple or uninteresting, regions sparsely sampled. It should be noted that the zero points may capture the characteristic regions of each and all of the curves, and so for a given curve, the sample points may include clusters in regions which are simple, i.e., the sampling strategy which results is the same for all of the curves. Thus, characteristic details defining each curve may be captured by the sampling strategy. Results of such a sampling strategy are presented below with reference to FIG. 6B. It should be noted that the new points can distinguish all curves under investigation, so the number of sampling points is reduced significantly. This results in unevenly sampled curves where essential locations are emphasized. In a preferred embodiment, the re-sampling scheme described above may be used in curve matching applications, various embodiments of which are described below with reference to FIG. 7-7D. In one embodiment, such re-sampling may be used to reduce the data required to represent discrete curves, i.e., may be used in a data compression scheme.

FIG. 6B—Examples of Re-Sampled Discrete Curves

FIG. 6B illustrates several examples of discrete curves re-sampled according to the method described above with reference to FIG. 6A. As FIG. 6B shows, four different curves have been re-sampled. Each curve originally included 40 points. In this example, a polynomial of order 13 was selected, with 13 corresponding zero points, resulting in 13 sample points for each curve. Thus, in this example, the number of points required to represent each curve was reduced by more that two thirds. As may be appreciated, such a reduction in the amount of information required to represent a curve (without a similar reduction in accuracy) may greatly improve run-time performance of pattern matching processes based on the curves. In one embodiment, such a sampling scheme may be used in various of the pattern matching methods described herein.

As FIG. 6B also shows, the lower panel compares the distribution of zeros of the order 13 polynomial with the distribution for a constant positive weight function (Gaussian quadrature).

FIG. 7—Discrete Curve Pattern Match Method

In one embodiment, a variant of equation (13) may be used to generate mapping operators $W_m$ which may be used to perform curve matching between a received target discrete curve and a plurality of template discrete curves. Is should be noted that the terms "target" and "template" are labels only, and are not intended to limit the techniques described herein to any particular types of discrete curves.

FIG. 7 is a flowchart diagram illustrating one embodiment of a method for locating regions of a target image that match an object of interest or a plurality of objects of interest. The object of interest may comprise a template image, or may be included in a template image. It should be noted that although the method of FIG. 7 (and methods of subsequent Figures) is described in terms of images, the method is broadly applicable to non-image data as well. In other words, image data is but one type of data contemplated for use in various embodiments of the methods described herein. It is further noted that in various embodiments, some of the steps may occur in a different order than shown, or may be omitted. Additional steps may also be performed.

As FIG. 7 shows, in 602, one or more mapping operators may be determined. The mapping operator(s) may be applicable to the template image(s) and optionally to one or more target images to map discrete curves representing image objects in the respective images to a form or space which enhances or amplifies differences between the object of interest and objects not of interest. This step may be considered a learning stage of the process, in that the mapping operator may be determined based on one or both of the template image and the type of target images to be analyzed. For example, in one embodiment, the template image (i.e., the object of interest) may be analyzed, and the mapping operator determined and/or configured such that the object of interest may be effectively distinguished from other objects, e.g., "background objects" or objects not of interest. In one embodiment, the template image itself may include both the object of interest and one or more background objects. The mapping operator may be configured to discriminate effectively between the object of interest and the one or more background objects. In another embodiment, one or more representative target images which include one or more background objects may be analyzed along with the template image to configure the mapping operator for effective discrimination between the object of interest and the background object(s). The determined mapping operator may then be stored for use in the matching stage 604, described below. The mapping operator may be applied to objects or curves detected in the template image and the resulting mapped curves stored for use in the matching stage, described below. For example, the original template discrete curve may characterize a first shape, and the mapped template discrete curve may characterize a second, different shape. Further details of the learning stage, and particularly the development of the mapping operator are provided below with reference to FIG. 7A, as well as in the Theory section which follows.

After the mapping operator has been determined, in 604 pattern matching, e.g., geometric pattern matching, e.g., curve matching, may be performed on one or more target images using the determined mapping operator to locate one or more instances of the object of interest. This step is referred to as the matching stage of the process. In one embodiment, after normalizing and/or re-sampling discrete curves from the target image(s), the curves may be compared to the mapped template discrete curves. In another embodiment, the mapping operator determined in 602 may be applied to objects or curves in the target images, and pattern matching performed between these curves and the mapped curves from the template image (from 602 above). Performing pattern matching on the one or more target images may generate pattern matching results, including, for example, which, if any, of the one or more target images match the object of interest. Further details of the matching stage are described below with reference to FIG. 8.

After the pattern matching has been performed, in 606 the pattern matching results may be output, for example, to a memory store on the computer, to a display screen, and/or to an external system coupled to the computer, such as a server computer system. In one embodiment, the pattern matching results may be used to trigger an action. For example, in the machine vision system illustrated in FIG. 4, the pattern matching results may indicate a part which does not match the template image, e.g., a part which fails a quality assurance test, and the part may be rejected, as shown.

FIG. 7A—Learning Stage

FIG. 7A is a more detailed flowchart of one embodiment of the learning stage 602 of the curve matching process. As noted above, in various embodiments, some of the steps may occur in a different order than shown, or may be omitted. Additional steps may also be performed.

As FIG. 7A shows, in 702, the template image may be acquired. In other words, the target image may be received by and/or stored in the computer system. The target image may be received from any of various sources, such as an image source coupled to the computer system over a network.

In 704, a set of discrete curves may be determined from the acquired template image. Note that as used herein, the term "discrete curve" refers to a sequence of points or vector, i.e., an ordered set of points, which characterizes a curve, edge, or boundary in an image or data set. The set of discrete curves may represent different objects in the image, may represent different aspects of a single object, or a combination of both. Note that as used herein, the terms "curve", "boundary", and "edge" are used interchangeably. For example, in one embodiment, determining the discrete set of curves from the template image may include performing boundary or edge detection on the template image to determine boundaries or edges of objects present in the target image. More specifically, the method may operate to detect at least one boundary or edge present in the template image corresponding to a shape of an object in the target image. The method may then determine at least one discrete curve, i.e., sequence of points, from the detected boundary or edge. It is noted that in some cases, the edges may not be visible by human eyesight, yet may be detectable by image analysis, e.g., by computer vision processes.

In one embodiment, sequences of points may comprise sequences of pixels, where each pixel has a position based on its location in the image. It should also be noted that in some embodiments, the points may be considered to be in the complex plane. In other words, the plane of the image may be considered to be the complex plane. For example, if a point in the image has a regular position (x,y), then its complex position is (x, iy), which may be represented by the complex number x+iy, thus each curve may be considered a vector of complex values. Thus, the template image and/or the target image is interpretable as a complex plane, where the sequences of points comprise sequences of pixels, and where positions of the pixels comprise complex values. A detailed description of one embodiment of a method for determining the set of discrete curves is presented below with reference to FIG. 7B. It is noted that the set of discrete curves may include one discrete curve, or a plurality of discrete curves.

After determining the set of discrete curves, in 706 a mapping operator may be determined based on the set of discrete curves. The mapping operator may be operable to emphasize differences between respective objects in an image. In one embodiment, the mapping operator may comprise non-negative components. In another embodiment, the mapping operator may comprise complex components, as described below with reference to FIG. 9B. Further details of determining the mapping operator are described below with reference to FIG. 7C.

In 708, the mapping operator may be applied to the set of discrete curves to generate a set of mapped discrete curves for the template image. In other words, the mapping operator may be applied to the point sequences which define the discrete curves of the template image, thereby generating mapped point sequences which define corresponding mapped discrete curves.

Finally, in 710, the mapping operator and the set of mapped discrete curves may be stored, for example, in a storage medium of the computer system 102 or an external computer system coupled to the computer system 102, such as a server computer. The stored mapping operator and mapped curves may be useable to perform pattern (shape) matching on one or more target images, as described in 604 above.

Figures 7B, 7C:
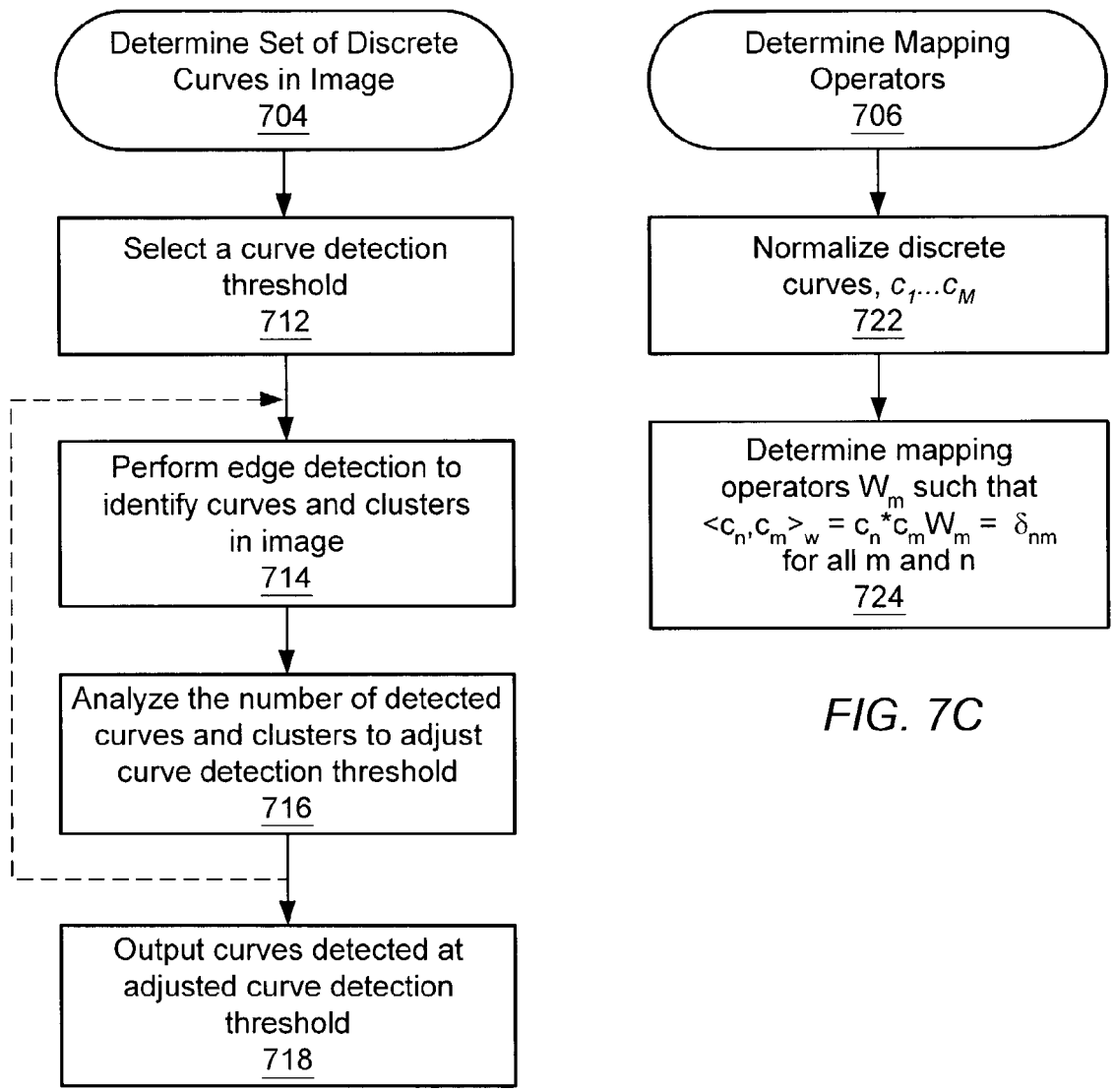
FIG. 7B is a flowchart diagram illustrating one embodiment of a method for determining a set of discrete curves in an image.
FIG. 7C is a flowchart diagram illustrating one embodiment of a method for determining the mapping operator for the method of FIG. 7A.

FIG. 7B—Determining the Set of Discrete Curves

FIG. 7B flowcharts a detailed embodiment of step 704 of FIG. 7A, wherein a set of discrete curves is determined from a template image. It is noted that although the method is described as applied to the template image, the method also may be applied to one or more target images to determine respective sets of discrete curves in the target images. As mentioned above, in various embodiments, some of the steps may occur in a different order than shown, or may be omitted, and/or additional steps may be performed, as desired.

In 712, a curve detection threshold may be determined. The curve detection threshold may be used to distinguish between curves, e.g., edges or boundaries, and clusters. A cluster is a point set which does not qualify as a discrete curve for the purposes of pattern matching in a given application. For example, if the threshold is set too low, meaning that the curve detection is too sensitive, then noise in the image may be detected as one or more curves which do not accurately reflect the object or objects to be characterized. Setting the threshold too low generally results in a large number of "detected curves" which are actually clusters. Conversely, setting the threshold too high may result in legitimate curves in the image going undetected. Thus, the threshold may need to be "tuned" for a particular application to effectively detect curves without also detecting too many clusters. The curve detection threshold may be based on various metrics, including one or more of curve length, e.g., number of points in the curve (or cluster), size, such as area spanned by the points, curvature, such as standard deviation of the curve, or any other metric useable to distinguish between curves and clusters.

Once a curve detection threshold has been determined, then in 714, edge detection, i.e., curve detection, may be performed on the image, using the determined curve detection threshold to identify curves and clusters in the image. The identification of curves and clusters in the image may result in respective numbers of detected curves and clusters.

In 716, the number of detected curves and clusters may be analyzed, and the threshold value adjusted accordingly. For example, if the number of curves detected is too great, then the threshold may be raised, or, if the number of curves detected is too small, the threshold value may be lowered.

As FIG. 7B shows, in one embodiment, steps 714 and 716 may be repeated one or more times to "tune" the curve detection threshold. For example, in one embodiment, the initial value of the threshold may be set to a relatively high value. The detection and analysis of steps 714 and 716 may then be performed using the set value, and the results stored. The threshold value may then be lowered, and the detection and analysis performed again. This process may be repeated, lowering the threshold value each time and storing the results. If the detection and analysis for a particular iteration results in a substantial increase in the number of detected curves, this may indicate that clusters are now being interpreted as curves, and so the previous threshold value (i.e., the threshold value of the previous iteration) may be considered to be the "tuned" value. The previous detection and analysis results may then be used, if stored, or the detection and analysis may be performed again with the tuned threshold value to regenerate the results.

Finally, the results may be output, as indicated in 718. Outputting the results may simply mean storing the results in a particular area of storage for later use, or may include sending the results to another program or system.

FIG. 7C—Determining the Mapping Operator(s)

FIG. 7C flowcharts a detailed embodiment of step 706 of FIG. 7A, wherein one or more mapping operators are determined based on the set of detected discrete curves of the template image. As noted above, in various embodiments, some of the steps shown may be performed in different order, or may be omitted, as desired. Additional steps may also be performed.

As FIG. 7C shows, in 722, each of the discrete curves may be normalized. A primary reason for normalizing curves is so that they may be compared with each other in the same terms. In various embodiments, normalization of each curve may include any of a variety of operations, as is well known in the art. For example, in one embodiment, the length of the discrete curve or sequence may be normalized to 1, or, as is commonly done, to 2, where the relative positions of the points along the (normalized) curve length range from −1 to +1. In one embodiment, each of the curves may also be re-sampled, e.g., over-sampled or under-sampled, to generate normalized curves of the same number of points. Thus, each of the set of discrete curves may be normalized (using the same normalization scheme, of course). In one embodiment, the optimal re-sampling scheme described above with reference to FIG. 6A may be used to re-sample the discrete curves.

After the curves have each been normalized, then in 724, a mapping operator $W_m$ for each curve may be determined which operates to emphasize differences between the curves. One way to do this is to compute $W_m$ for each curve $c_m$ such that for each pair of curves $c_n$ and $c_m$, $$\langle c_n, c_m \rangle_{w_m} = \delta_{nm} \quad (15)$$

where $\delta_{nm}$ is the Kronecker delta, is (substantially) satisfied. In other words, if $c_n$ and $c_m$ are very similar, then the inner or scalar product of the two curves will be close to 1, and if the two curves are dissimilar, the product will be close to zero. The application of $W_m$ to the curves may thus serve to emphasize or amplify differences between the curves. As noted above, in one embodiment, the points which define each curve may be complex valued, and so the inner product may be calculated thus:

$$\langle c_n, c_m \rangle_{w_m} = \sum_{i=1}^{N} c_{ni} c_{mi}^* W_{m_i} = \delta_{nm} \quad (16)$$

where the product is between $c_n$ and the complex conjugate of $c_m$, as is well known in the art. It should be noted that the complex vectors $c_n$, $c_m$, and each $W_m$ preferably all have the same number of elements. Thus, expression (16) for each pair of curves may provide a set of equations with which each $W_m$ may be solved. It should also be noted that in one embodiment, a perfect solution of $W_m$ (with respect to the formal definition of $\delta_{nm}$) is not necessary, but that an approximate solution may suffice. In other words, the solution $W_m$ may not meet the constraints of equation (16) exactly for every pair of curves, but may still operate to effectively discriminate between dissimilar curves.

Figure 7D:
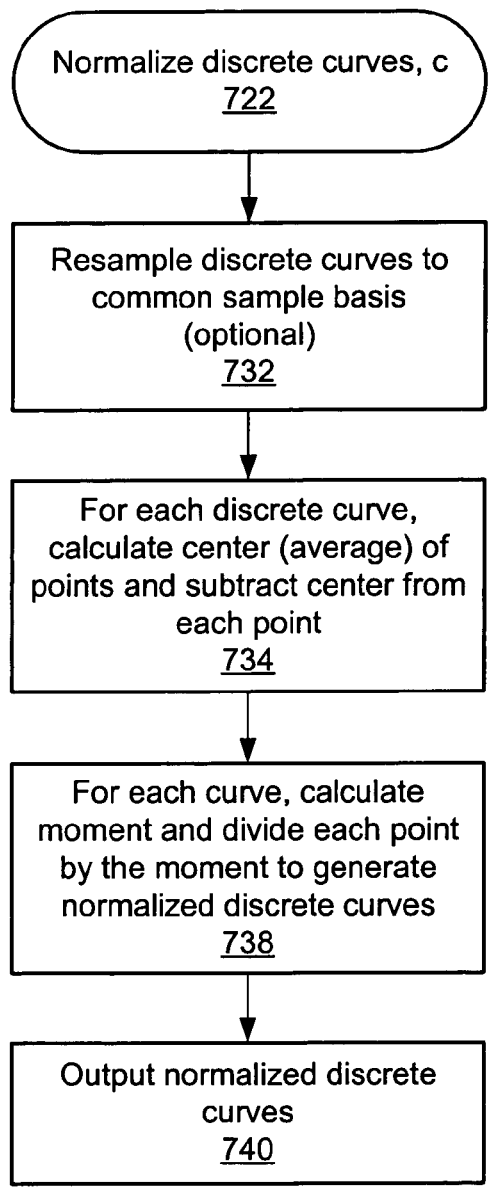
FIG. 7D is a flowchart diagram illustrating one embodiment of a method for normalizing discrete curves for the method of FIG. 7A.

FIG. 7D—Normalization of Discrete Curves

FIG. 7D flowcharts one embodiment of a method for normalizing one or more discrete curves, as mentioned above in step 722 of the method of FIG. 7C. In this example, each discrete curve is normalized based on its moment. It should be noted that the method shown is but one example of a normalization scheme for discrete curves, and that many other normalization schemes may also be suitable, as is well known in the art.

In 732, each of the one or more discrete curves may optionally be re-sampled to a common sample basis. In other words, the discrete curves may be re-sampled such that each discrete curve has the same number of points. In one embodiment, the discrete curves may be re-sampled uniformly, i.e., the sample points along each discrete curve may be evenly distributed. In another embodiment, each discrete curve may be re-sampled in accordance with the re-sampling scheme described above with reference to FIGS. 6A–6B. In other embodiments, the discrete curves may be normalized and/or re-sampled a plurality of times.

In one embodiment, each point in the discrete curve or point sequence may be normalized based on the geometric center of the sequence of points. Thus, in 734, a center or average position may be calculated for each discrete curve. In this case, assuming N sequential points with respective positions $(x_n)$, where $n=1, N$, the center $x_c$ may be calculated thus:

$$x_c = \frac{x_1 + \ldots + x_N}{N} \quad (17)$$

Each point $(x_n)$ may then be normalized by subtracting the center, giving a new, normalized sequence of points:

$$(x_1 - x_c), \ldots, (x_N - x_c) = x_1', \ldots, x_N'. \quad (18)$$

Then, in 738, the moment of the sequence or discrete curve may be normalized, for example, to 1. In this case, the moment of each sequence or discrete curve may be calculated by:

$$S = \left( \sum_{1}^{N} |x_j - x_c|^2 \right)^{\frac{1}{2}}. \quad (19)$$

The normalized point sequence is then:

$$\frac{x_1 - x_c}{S}, \ldots, \frac{x_N - x_c}{S}. \quad (20)$$

Finally, in 740, the normalized discrete curves may be output, such as to a display, memory location, or external system, among others. Thus, each discrete curve may be normalized based on its respective moment. As noted above, other normalization schemes are also contemplated for use in various embodiments of the present invention.

Figure 8A:
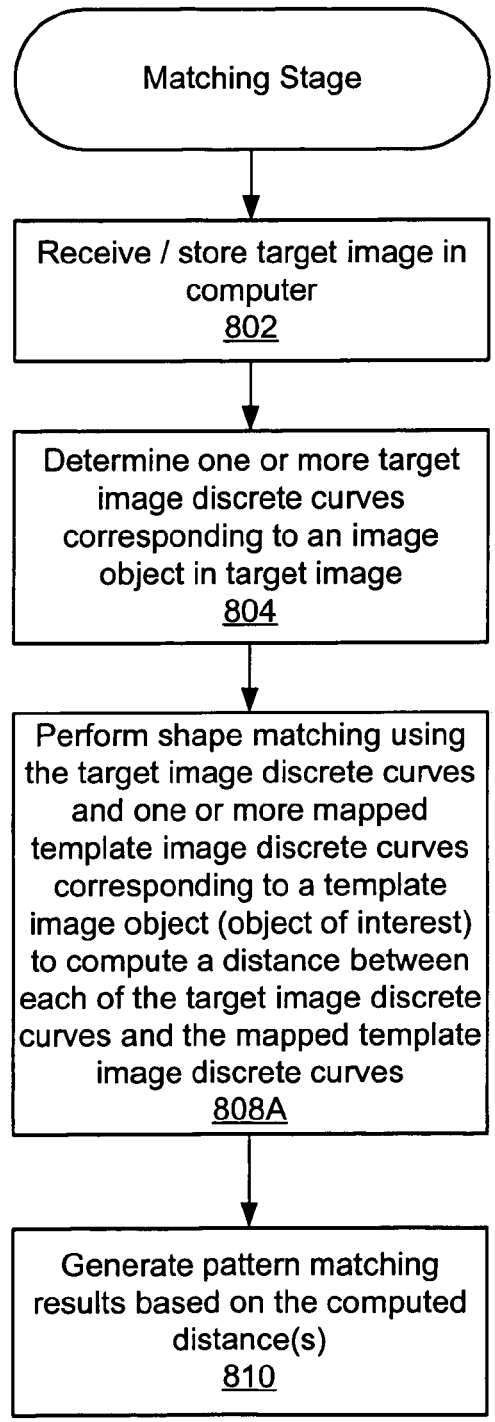
FIGS. 8A and 8B are flowchart diagrams illustrating embodiments of the matching stage of the method of FIG. 7.
Figures 8B, 9A:
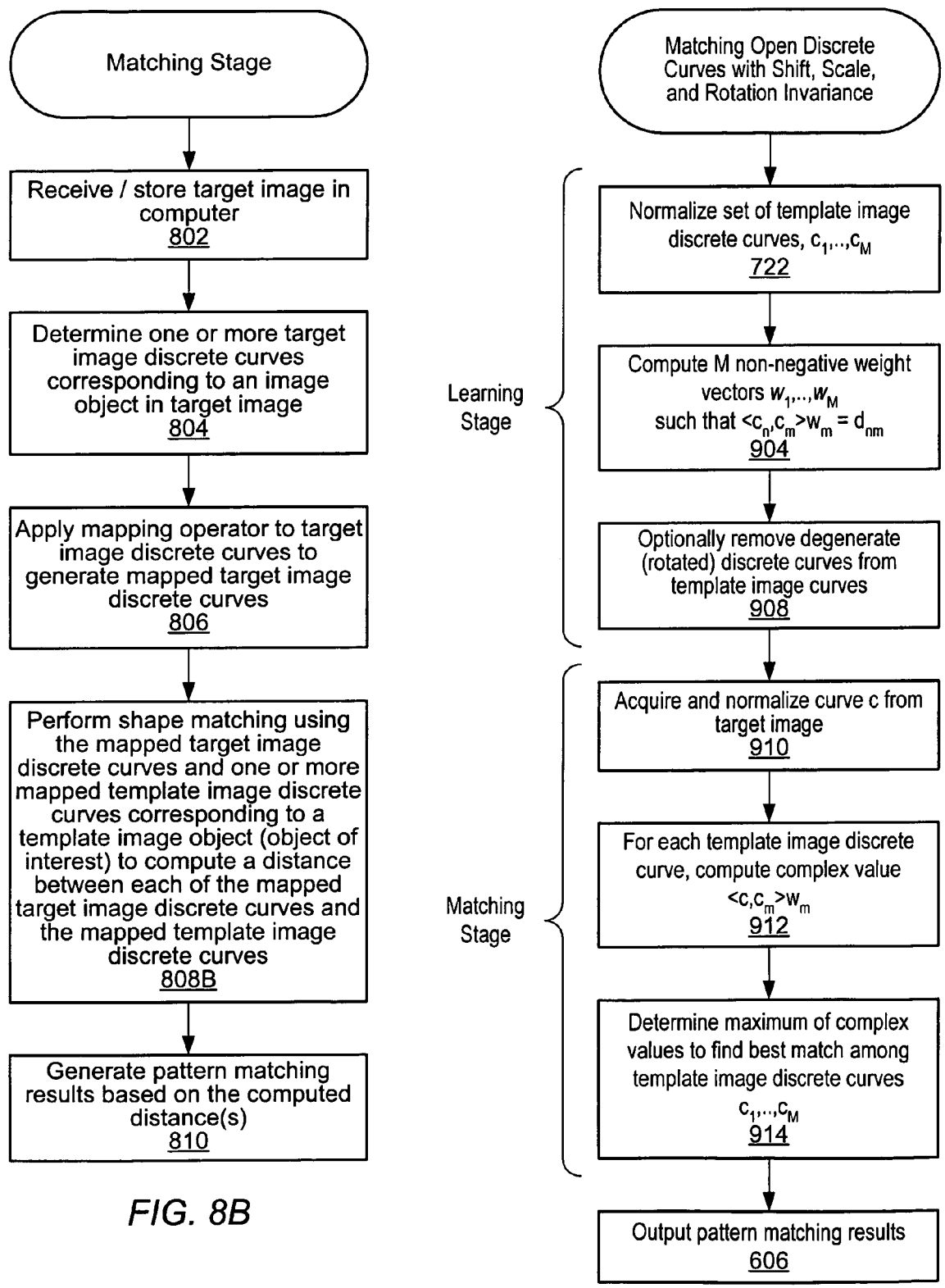
FIG. 9A is a flowchart diagram illustrating one embodiment of a method for matching open discrete curves with shift, scale, and rotation invariance.

FIGS. 8A–8B—Matching Stage

FIGS. 8A and 8B are more detailed flowchart diagrams illustrating embodiments of the matching stage described above with reference to FIG. 7. More specifically, FIG. 8A illustrates a method where mapping operators are applied to respective template discrete curves and compared with target curves, while FIG. 8B illustrates and embodiment where mapping operators are applied to both template discrete curves and target discrete curves, and the mapped curves are then compared.

It should be noted that although the method is generally described in terms of matching a single discrete curve (sequence of points), multiple discrete curves (sequences of points) may also be detected and matched according to the method described. In other words, the template image may include multiple discrete curves, each corresponding to a template image object, or to different aspects of a single object, or a combination of both. A purpose of the matching phase may be to match any of the plurality of discrete curves in the template image to any of the discrete curves present in one or more target images. As mentioned above, although the methods are described in terms of images, the methods are broadly applicable to non-image data as well, i.e., image data is but one type of data contemplated for use in various embodiments of the methods described herein. It is further noted that in various embodiments, some of the steps may occur in a different order than shown, or may be omitted. Additional steps may also be performed.

As FIGS. 8A (and 8B) shows, in 802, the target image may be acquired. In other words, the target image may be received by and/or stored in the computer system. The target image may be received from any of various sources, as desired, including an image source coupled to the computer system over a network. It is noted than in other embodiments, the target image may already be present in the computer system, and thus step 802 may be omitted. In this embodiment, the template image is already stored in the computer system, although in other embodiments the pattern or template image may be received prior to or after reception of the target image.

In 804, a target image discrete curve may be determined from the target image, corresponding to a respective object in the target image. In other words, the target image discrete curve may correspond to one or more geometric features of the respective object. As noted above, the term "discrete curve" is herein used interchangeably with the term "sequence of points". Similarly, the terms "boundary" and "edge" are used interchangeably. For example, in one embodiment, determining the target image discrete curve from the target image may include performing boundary or edge detection on the target image to determine boundaries or edges of objects present in the target image. More specifically, the method may operate to detect at least one boundary or edge present in the target image corresponding to a shape of an object in the target image. The method may then determine a sequence of points from the detected boundary or edge which defines the target image discrete curve.

In one embodiment, a plurality of target image discrete curves may be determined from the target image. Each of the plurality of target image discrete curves may correspond to a respective image object or to a respective portion of an image object in the target image. Said another way, there may be multiple objects (or aspects of a single object) in the target image, each represented by discrete curve.

As FIG. 8A indicates, after the determination of the target image discrete curve(s), in 808A, curve matching may be performed on the target image discrete curve(s) and one or more mapped template image discrete curves, where each of the mapped template image discrete curve corresponds to an object of interest, or to a portion of the object of interest. In performing the curve matching a distance may be computed for the target image discrete curve relative to the mapped template image discrete curve. The computed distance may be a metric which indicates a degree of difference between the target image discrete curve and each of the one or more mapped template image discrete curves, and thus, may indicate a degree of difference between the object in the target image and the object of interest. As described above in the Theory section, in one embodiment, the distance metric may comprise a scalar product, i.e., an inner or dot product, between the mapped or weighted template discrete curve and the target discrete curve, where values close to unity indicate a substantial match.

In an alternate embodiment, illustrated in 806 of FIG. 8B, the mapping operator(s) may be applied in a different manner. Rather than applying the mapping operator(s) $W_m$ only to the template discrete curves, in one embodiment, the mapping operator may be applied to both the template discrete curve and the target discrete curve(s). For example, the mapping operator may be the square root of $W_m$, i.e., $W_m^{1/2}$ In this case, both the template discrete curve and the target discrete curve may be mapped respectively to a mapped template discrete curve and a mapped target discrete curve, and the two mapped curves compared. It should be noted that this alternate approach is mathematically equivalent to mapping only the template discrete curve using $W_m$. However, in this alternate embodiment, the symmetric application of the mapping operator ($W_m^{1/2}$) may be interpreted as mapping both discrete curves into forms which enhance differences between the curves. For example, the mapping operator may be applied to the template discrete curve in the learning stage of the process, as described above with reference to FIG. 7A, then, in the matching stage, the mapping operator may be applied to the target discrete curve, as indicated in 806 of FIG. 8B.

Thus, in this alternate embodiment, after the target image discrete curve (or target image discrete curves) has been determined, then in 806, the target image discrete curve may be mapped to a different mapped target image discrete curve using a mapping operator. The mapping operator, $W(x)$, may operate to transform the target image discrete curve into a form (the mapped target image discrete curve) which is more easily distinguishable from (mapped) discrete curves corresponding to objects not of interest in the target image. In other words, the mapping operator may operate to emphasize differences between respective objects, or aspects of objects. In the descriptions that follow, references to target discrete curves and comparisons between the target discrete curves and the mapped template discrete curves may be interpreted in terms of the method of FIG. 8A or the method of FIG. 8B. In other words, in embodiments corresponding to the method of FIG. 8B, the target discrete curves may comprise mapped target discrete curves. After the target discrete curve (or curves) has been mapped to a mapped target discrete curve, then in 808B, curve matching may be performed on the mapped target image discrete curve(s) and one or more mapped template image discrete curves, as indicated in FIG. 8B.

In an embodiment where the target image includes a plurality of target image discrete curves, curve matching may be performed on each of the target image discrete curves relative to the mapped template image discrete curve. In this case a distance measure may be computed for each of the target image discrete curve relative to the mapped template image discrete curve. In the alternate embodiment described above, each of the target discrete curves may have been mapped to a corresponding plurality of mapped target image discrete curves prior to, or as part of, the computation of the distance measure.

It should be noted that in some embodiments, the template image may include multiple discrete curves, i.e., object of interest sequences of points, or there may be multiple template images from which the template discrete curves may be determined. In other words, there may be a plurality of objects of interest, or, the object of interest may include a plurality of sub-objects, each represented by a respective discrete curve. In this case, curve matching may be performed on each of the target image discrete curves relative to each of the mapped template image discrete curves, computing a distance measure for each of the target image discrete curves relative to each of the mapped template image discrete curves.

In one embodiment, the mapped template image discrete curve may be generated from a characterization of the object of interest. In other words, the method may include characterizing the object of interest to produce the mapped template image discrete curve, for example, in the learning stage, as described above with reference to FIG. 7A. Thus, characterizing the object of interest may be performed prior to acquiring the target image. Characterizing the object of interest may include determining a template image discrete curve from information regarding the object of interest, where the template image discrete curve corresponds to the object of interest. The template image discrete curve may then be mapped to the mapped template image discrete curve using the mapping operator. In a preferred embodiment, the information regarding the object of interest comprises a template image containing the object of interest, i.e., the template image referred to above. Of course, as mentioned above, in other embodiments, the discrete curves may be determined from non-image data sets rather than images.

It is noted that because the mapping operator emphasizes differences between curves, i.e., sequences of points, the distance between the target image discrete curve (or the mapped target image discrete curve) and the mapped template image discrete curve may be greater than a distance computed between the target image discrete curve and the template image discrete curve. In other words, the distance computed between the target image discrete curve and the template image discrete curve indicates a degree of difference between the original detected discrete curve in the target image (the target image discrete curve) and the original detected discrete curve in the template image (the template image discrete curve, i.e., the object of interest), while the distance between the (mapped) target image discrete curve and the mapped template image discrete curve indicates a degree of difference between the (mapped) discrete curve in the target image and the mapped discrete curve from the template image (the mapped template image discrete curve). Because the mapping operator serves to amplify the differences between the original curves, the mapped curve(s) reflect a greater distance measure.

In one embodiment, the mapping operator may be a discrete curve mapping operator which maps a first discrete curve to a second discrete curve. As mentioned above, the term "discrete curve" refers to an ordered set or sequence of points which have a certain direction. Furthermore, concatenated versions of these points do not generate intersections. In other words, the curve is simple, although in various embodiment, the curve may be open or closed. In various embodiments, the mapping operator may be a linear mapping operator, and/or a non-linear mapping operator. In one embodiment, the mapping operator may be a Sturm-Liouville operator. For more information on Sturm-Liouville operators, please see the Theory section above.

In one embodiment, the mapped discrete curve (either the mapped template discrete curve or the mapped target discrete curve) may be a unique discrete curve generated from the template or target image discrete curve. In other words, for any template or target image discrete curve, the mapping operator may be operable to generate a second, unique discrete curve. The mapped image discrete curve may be more stable to image disturbances than the original image discrete curve. Said another way, the mapped image discrete curve may be more robust or less susceptible to disturbances, e.g., noise, distortions, or perturbations, than the original image discrete curve.

It is noted that in one embodiment, the boundary (or boundaries) detected in the target image may correspond to or define at least one visual boundary that is visually identifiable in the target image, i.e., the boundary may be a visibly distinguishable geometric feature of an object in the target image. In contrast, the mapped target image discrete curve may not define a visual boundary that is visually identifiable in the target image. In other words, the mapping operator may transform the boundary or edge defined by the target image discrete curve into a curve (defined by the mapped target image discrete curve) which bears little resemblance to the original curve (e.g., the original edge or boundary).

Similarly, whereas the boundary (or boundaries) detected to be present in the target image may correspond to or define at least one shape that is visually identifiable in the object, the mapped target image discrete curve may not define a shape that is visually identifiable in the object. Said another way, the target image discrete curve may define at least one shape or visual boundary that is visually identifiable in the target image, while the mapped target image discrete curve may define a shape or visual boundary that is not visually identifiable in the target image.

In embodiments where non-image data are analyzed, each discrete curve may correspond to a respective data object, or to a portion of a data object. In other words, each discrete curve may define a boundary, edge, or shape in the data.

In one embodiment mapping the template or target image discrete curve to the different mapped template or target image discrete curve may include applying the mapping operator to each point in the template or target image discrete curve to generate corresponding points in the mapped template or target image discrete curve. For example, the target image discrete curve may be considered to be a first vector, where the mapping operator W and the first discrete curve vector have the same number of elements. In this embodiment, mapping the target image discrete curve to the different mapped target image discrete curve may include multiplying each element of the mapping operator W with corresponding elements in the first vector to generate a second vector. The elements of the second discrete curve vector may then comprise the mapped target image discrete curve. This description applies to the template image discrete curve(s), as well.

As also mentioned above, in some embodiments, the elements of the first discrete curve vector may be complex. In this case, multiplying each element of the mapping operator W with corresponding elements in the first discrete curve vector may comprise multiplying each element of the mapping operator W with complex conjugates of corresponding elements in the first discrete curve vector, as is well-known in the art.

In 808A of FIG. 8A, curve matching may be performed on the target image discrete curve and a mapped template image discrete curve, where the mapped template image discrete curve corresponds to the object of interest. In performing the curve matching a distance may be computed for the target image discrete curve relative to the mapped template image discrete curve. The computed distance may be a metric which indicates a degree of difference between the target image discrete curve and the mapped template image discrete curve, and thus, may indicate a degree of difference between the object in the target image and the object of interest. In embodiments where there are multiple template discrete curves, then the curve matching may be performed between the target discrete curve and each of the template discrete curves.

Alternately, in the embodiment of FIG. 8B, after the target image discrete curve has been mapped in 806, then in 808B, curve matching may be performed on the mapped target image discrete curve and the mapped template image discrete curve, where the mapped template image discrete curve corresponds to the object of interest, resulting in a computed distance for the mapped target image discrete curve relative to the mapped template image discrete curve.

Finally, in 810, pattern matching results may be generated based on the distance or distances computed in 808 (A or B). In one embodiment, the computed distance may be compared to a threshold value, and if the distance is less than the threshold value, the object in the target image represented by the (mapped) target image discrete curve may be considered a match with respect to the object of interest represented by the mapped template image discrete curve. It is noted that a computed distance value of zero indicates a perfect match. In one embodiment, a matching score for the target image object may be calculated based on the proximity of the distance value to zero. Thus, generating pattern matching results may comprise generating information indicating one or more matches for the object of interest in the target image.

In an embodiment where the target image includes a plurality of target image discrete curves, each of which may be optionally mapped to a corresponding plurality of mapped target image discrete curves, pattern matching results may be generated based on the distance measures for each of the (optionally mapped) target image discrete curves with respect to the mapped template image discrete curves. Similarly, when the template image includes a plurality of discrete curves, pattern matching results may be generated based on the distance measures for each of the (optionally mapped) target image discrete curves with respect to each of the mapped template image discrete curves.

In one embodiment, after the pattern matching results have been generated in 810, the method may include outputting the pattern matching results. In various embodiments, outputting the pattern matching results may include, for example, sending the results to an external system, such as to an external computer over a network, displaying the results on a display, such as a computer display or a printer, storing the results in a particular memory location or log, or signaling a system or program to perform a task.

In one embodiment, the mapping operator(s) may be re-calculated to more effectively match and/or discriminate between template image discrete curves and target image discrete curves, e.g., using information related to one or more target images. For example, a new or modified mapping operator W (or a plurality of new or modified mapping operators $W_m$) may be computed using the template image discrete curves and discrete curves from additional target images or discrete curves which may not have been included in the first calculation of W. In various embodiments, the original mapping operator(s) W may be replaced, or may simply be modified using the additional discrete curve information. Thus, some or all of the terms of the mapping operator(s) may be configurable for different objects of interest. In other words, the mapping operator may be computed or adjusted to "tune" the operator for particular objects or sets of objects.

In one embodiment, the mapping operator may include at least one parameter that is configurable to enhance differences between respective objects of interest and objects not of interest. In other words, the mapping operator may include a parameter which may be adjusted to "tune" the operator for particular objects or sets of objects. Said another way, given an object of interest and one or more objects not of interest, the at least one parameter may be adjustable to particularly emphasize differences between that object of interest and the one or more objects not of interest.

For example, in one embodiment, first information may be received regarding the object of interest, e.g., which characterizes the template image. Second information regarding one or more objects that are not of interest may also be received. At least one parameter for the mapping operator may then be determined based on the first and second information, where the parameter may be determined to enhance a distance between mapped discrete curves or point sequences corresponding to the object of interest and mapped discrete curves or point sequences corresponding to the one or more objects that are not of interest. The mapping operator may then be configured according to the determined parameter(s).

Thus, the mapping operator may be computed, adjusted or tuned to enhance or increase a distance between mapped discrete curves (point sequences) corresponding to the object of interest and mapped discrete curves (point sequences) corresponding to objects that are not of interest.

Shift, Scale, and Rotation Invariance

A more difficult situation arises when rotations of all discrete curves are also valid transforms. Conceptually, formulas (13) and (14) can still be used to perform the matching procedure. However, in this approach, instead of looking for numbers in formula (1) that are close to 1, the goal is to look for a complex number that has a magnitude close to 1. The phase of the complex number represents the relative angle between the original curve and the match found.

Let $c_1, \ldots, c_M$ be complex discrete curves of same size in the complex plane. The best match to a curve c must be determined.

Figure 9B:
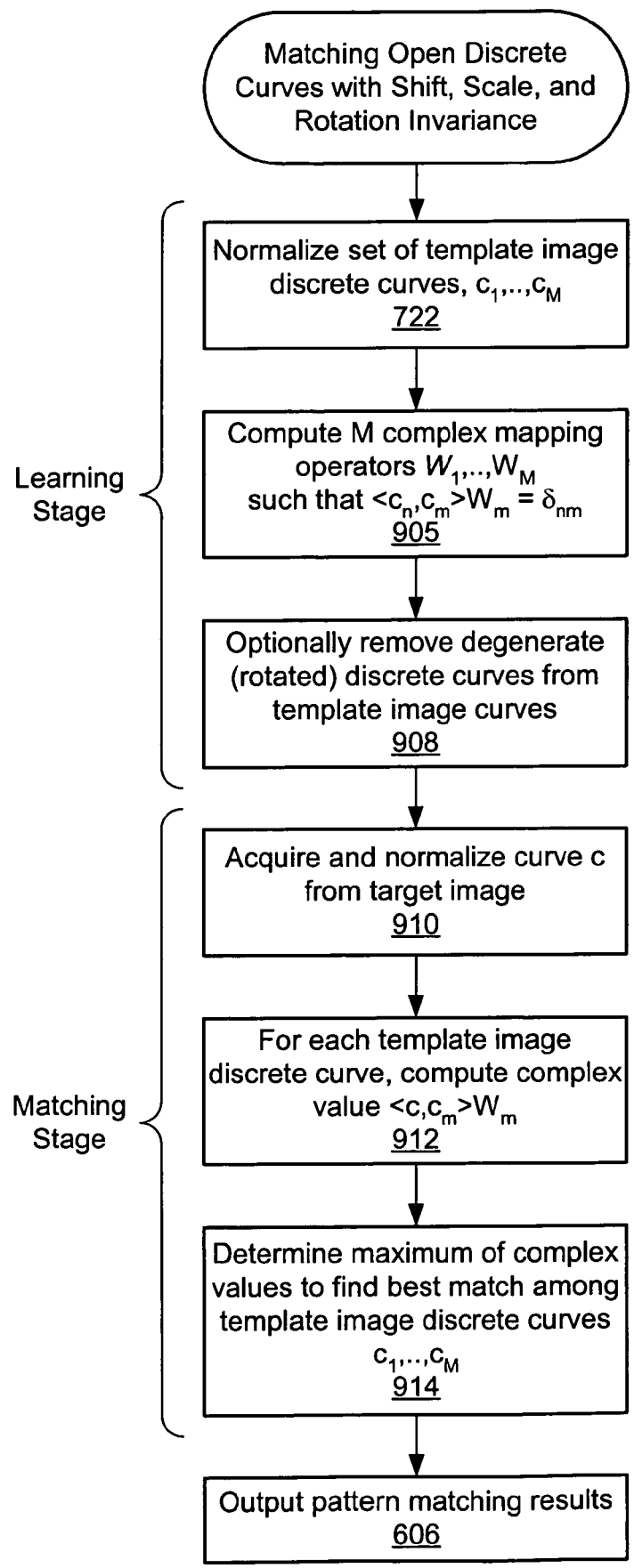
FIG. 9B is a flowchart diagram illustrating another embodiment of a method for matching open discrete curves with shift, scale, and rotation invariance.

FIGS. 9A and 9B—Matching of Discrete Open Curves with Shift, Scale, and Rotation Invariance FIGS. 9A and 9B illustrate further embodiments of the method described above with reference to FIG. 7. More specifically, FIG. 9A flowcharts one embodiment of a method for matching discrete open curves with shift, scale, and rotation invariance, where a received image (or data set) is searched for the presence of an object of interest using a nonnegative mapping operator (or a plurality of non-negative mapping operators). The object of interest may comprise a template image, or may be included in a template image. It is noted that in various embodiments, some of the steps may occur in a different order than shown, or may be omitted. Additional steps may also be performed.

As FIG. 9A shows, in 722 a set S of template image discrete curves, $c_1, \ldots, c_M$, may be normalized, as described above with reference to FIGS. 7C and 7D. For example, the curves may be normalized in accordance with the method described above with reference to FIG. 7D, although it is noted that any other normalization scheme may also be used. In one embodiment, as part of the normalization process, each discrete curve may be uniformly sampled, as described above in step 732 of FIG. 7D. In a preferred embodiment, each (normalized) discrete curve has the same number of points.

After all of the discrete curves have been normalized, then, in 904, mapping operators $W_m$ may be computed based on the discrete curves, as described above with reference to FIG. 7C. In one embodiment, each mapping operator $W_m$ may comprise a non-negative mapping function $W_m$ such that $<c_n,c_m>_{W_m}=\delta_{nm}$ is satisfied in the least-square sense for all n and m, as noted above in (15) and (16). Said another way, M non-negative mapping functions $W_1, \ldots, W_M$ may be computed such that $<c_n,c_m>_{W_m}=\delta_{nm}$ is (substantially) satisfied (usually, in the least-square sense) for all n and m. In one embodiment, the constraint of smoothly changing components of $W_m$ may also be added. As also described above, the mapping operators may be operable to map discrete curves into a form which emphasizes or amplifies the differences between the discrete curves.

In 908, degenerate (rotated) discrete curves may optionally be removed from the template image curves. In other words, if one (or more) of the numbers $<c_n,c_m>_{W_m}$ for n≠m has (have) a magnitude of close to 1, then the curves are not independent. In other words, they are rotated versions of other curves in S, thus, it may be necessary to eliminate such curves from S.

It may be noted that steps 722, 904, and 908 above together may compose one embodiment of a learning stage, as referred to above with reference to FIG. 7.

Once the degenerate curves have (optionally) been removed from the set of discrete curves S, then in 910, a curve c from a target image (or data set) may be acquired and normalized and/or re-sampled. In other words, curve c may be acquired from the target image, then normalized and/or re-sampled such that the discrete curve c has the same number of points as each of the template curves. Additionally, in one embodiment, the curve c may be re-sampled in accordance with a sampling scheme used for each of the template curves.

Then, in 912, for each template image curve $c_m$, the complex value $<c,c_m>_{w_m}$ may be computed. Once all of the complex values for $<c,c_m>_{W_m}$ have been calculated, then in 914, the maximum value may be determined, where the maximum value corresponds to a best match among the template image discrete curves. In other words, the magnitudes of all of the computed complex numbers may be determined, and the maximum magnitude ascertained. The index m belonging to this maximum represents the best match among the given set $c_1, \ldots, c_M$. The phase of this complex number may be used to determine the angle between c and $c_m$.

As noted above, in one embodiment, the mapping operator may be considered to be $W_m^{1/2}$, in which case the mapping operator may be applied to both the template image curve $c_m$ and the target curve c.

Finally, in 606, the output pattern matching results may be output, e.g., for use by the system, or by an external system, as desired. It is noted that steps 910, 912, and 914 above together compose one embodiment of a matching stage, as referred above with reference to FIG. 7.

Non-positive Weights

The original non-negativity constraint of the weight function W follows directly from the identity:

$$\sum_{n=1}^{N} (y_{n+j}v_n)(z_n v_n)^* = \sum_{n=1}^{N} y_{n+j} z_n^* v_n v_n^* = \sum_{n=1}^{N} y_{n+j} z_n^* w_n \quad (21)$$

where v is a complex weight function, and y and z are discrete curves in the plane. The constraint may be expressed thusly: $w_n = v_n v_n^* = |v_n|^2$. The quality of matching routines may be further improved when formula (21) is replaced with the more general version:

$$\langle y, z \rangle_w = \sum_{n=1}^{N} y_{n+j} z_n^* w_n \quad (22)$$

where w is a complex discrete weight function that can vary with z. Compared to (21) the new formula (22) may offer many new degrees of freedom.

FIG. 9B is a flowchart of yet another embodiment of the method described above with reference to FIG. 7. More specifically, FIG. 9B flowcharts an embodiment of the method presented in FIG. 9A, but where the weight function is complex as opposed to non-negative. As before, let $c_1, \ldots, c_M$ be given complex discrete curves of same size in the complex plane. The best match to a curve c may be determined. As FIG. 9B shows, all of the steps other than 905 are the same as those in FIG. 9A, and so the descriptions are abbreviated.

As FIG. 9B shows, in 722 a set S of template image discrete curves, $c_1, \ldots, c_M$, may be normalized, as described above. In a preferred embodiment, each (normalized) discrete curve has the same number of points.

After all of the discrete curves have been normalized, then, in 905, complex mapping operators $W_m$ may be computed based on the discrete curves, as described above with reference to FIG. 7C. In one embodiment, each mapping operator $W_m$ may comprise a complex weight function $W_m$ such that $<c_n,c_m>_{w_m} = \delta_{nm}$ is satisfied in the least-square sense for all n and m, as noted above in (15) and (16). Said another way, M complex weight functions $W_m$ may be computed such that $<c_n,c_m>_{w_m} = \delta_{nm}$ is (substantially) satisfied (usually, in the least-square sense) for all n and m. As mentioned above, in one embodiment, the constraint of smoothly changing components of $W_m$ may also be added.

In 908, degenerate (rotated) discrete curves may optionally be removed from the template image curves, and in 910, a curve c from a target image may be acquired and normalized. Then, in 912, for each template image curve $c_m$, the complex value $<c,c_m>_{w_m}$ may be computed. Once all of the complex values for $<c,c_m>_{w_m}$ have been calculated, then in 914, the maximum value may be determined, where the maximum value corresponds to a best match among the template image discrete curves. The curve from the set which produces the maximum magnitude represents the best match among the given set $c_1, \ldots, c_M$. As noted above, the phase of this complex number may be used to determine the angle between c and $c_m$.

Finally, in 606, the output pattern matching results may be output, e.g., for use by the system, or by an external system, as desired.

The method of FIG. 9B can also be regarded as a mechanism translating the original set of curves into a second set guaranteeing both (substantial) orthonormality of curves and the property to be a discrete curve (slowly varying components of w).

Figure 9C:
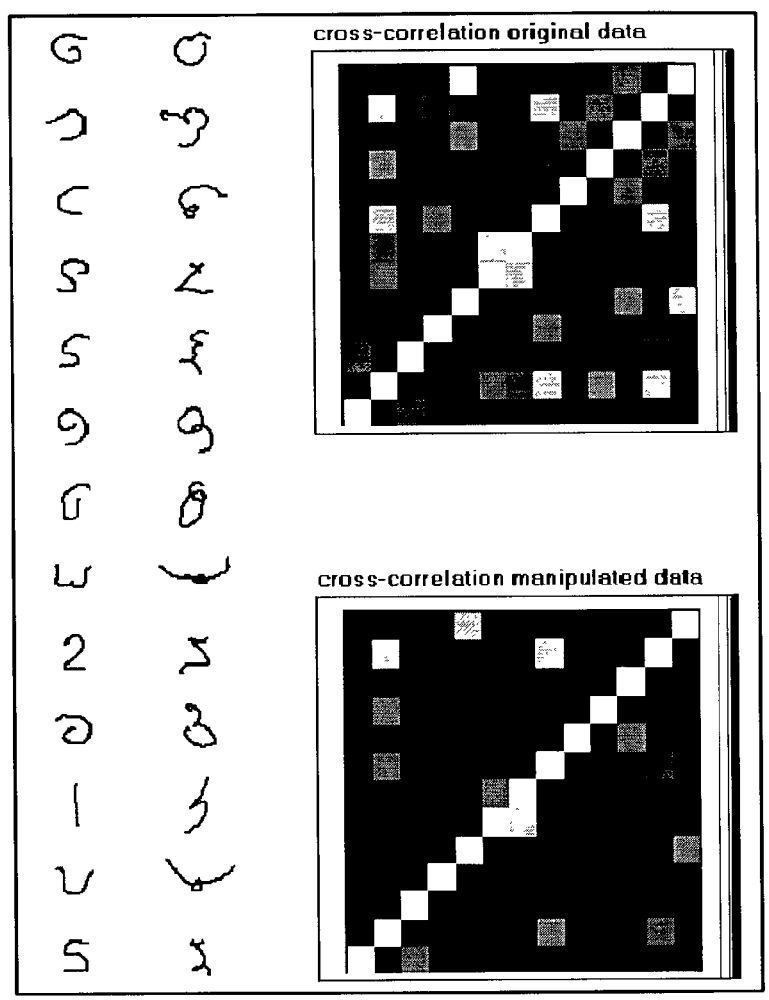
FIG. 9C illustrates a mapping of a set of open curves and cross correlations for the original and mapped discrete curves, according to one embodiment.

FIG. 9C demonstrates the application and results of the transform, as described above with reference to FIG. 9B, applied to a specific set of discrete open curves, and also compares the magnitudes of the cross-correlation of the original curves with that of the transformed curves. As FIG. 9C shows, the left column of curves is the original set of discrete open curves, and the right column of curves is the transformed set. In other words, the discrete open curves in the left column are transformed (by application of the mapping operator w) to give the curves in the right column. As may be seen, the transformation may amplify or enhance characteristic curvatures of each curve, thereby increasing the ability of the method to discriminate and match between curves.

FIG. 9C also shows cross-correlation for the original curves (top figure), and for the transformed curves (bottom figure). In an ideal case in which each curve is orthonormal to every other curve, the cross-correlation chart would simply show data points with value 1 forming a diagonal, with all other values equal to zero. In other words, correlation of a particular curve with itself gives a correlation of 1, while correlation of the curve with any other curve results in a correlation of zero. Of course, in reality, the results are not so clear cut. However, as FIG. 9C shows, the cross-correlation of the untransformed curves is clearly less efficient than the cross-correlation of the transformed curves. Said another way, the correlation of the transformed curves is closer to the ideal case, in that after the transform has been applied, the curves are much closer to mutual orthogonality than the original curves.

Optimal Discrete Closed Curve Descriptors in 2D

The above methods provide means for matching discrete open curves. However, there are many cases where the curves to be analyzed and matched are closed curves. Closed curves do not have a unique start and end, and so a matching process must take into account the fact that rotations are possible. As described below, a function may be defined which provides a similarity measure between closed curves.

Let $y=(y_1, \ldots, y_N)$ and $z=(z_1, \ldots, z_N)$ be two discrete closed curves in the complex plane, C. Let y and z be normalized, i.e.

$$\sum_{n=1}^{N} y_n = \sum_{n=1}^{N} z_n = 0 \text{ and } \sum_{n=1}^{N} |y_n|^2 = \sum_{n=1}^{N} |z_n|^2 = 1$$

According to the first part of (5), the distance between these two curves y and z is $$d_{full}(y, z) = \sqrt{1 - \left|\sum_{n=1}^{N} y_n z_n^*\right|^2} \quad (23)$$

Formula (23) can be used to define a similarity measure between y and z that is constant when y and/or z are shifted cyclically and/or are rotated in reverse order.

Figure 10A:
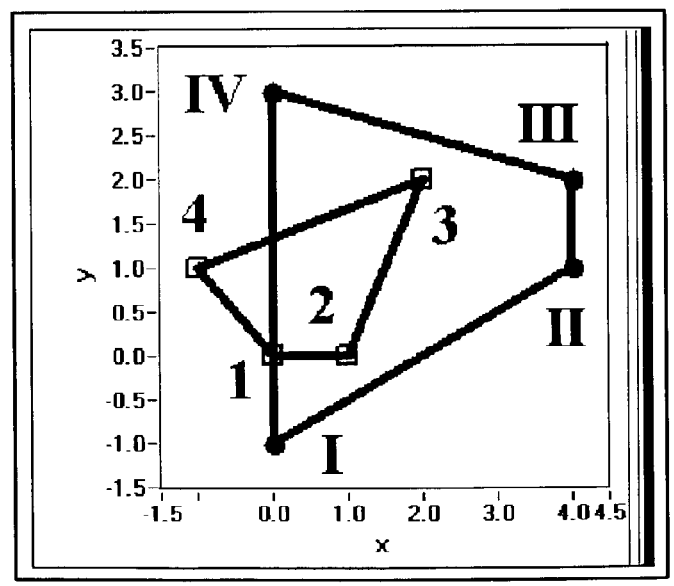
FIG. 10A illustrates two closed curves which are counter-clockwise oriented, according to one embodiment.

FIG. 10A—Discrete Closed Curves

FIG. 10A illustrates two examples of discrete closed curves, defined by point sequences I, II, III, IV, and 1, 2, 3, 4, respectively, following a counter-clockwise numbering convention. In this example, the magnitudes of all cross-correlation and convolution components vary between 0.2018 and 0.9213. The best match of 0.9213 is achieved when (I,II,III,IV) is directly compared with (3,4,1,2). Further examples of discrete closed curves are described below.

The above equation (23) provides a basis for the following theorem:

Theorem 1:

Let $$d(y, z) = 1 - \max_{\substack{s=0,1 \\ j=0,\ldots,N-1}} \left|\sum_{n=1}^{N} y_{(-1)^s n+j} z_n^*\right|^2 \cdot d$$

is a metric in the space f representing all normalized discrete closed curves of size N in the complex plane. The derived distance in the space of arbitrary discrete closed curves in the complex plane (d applied to normalized curves) is a semi-metric.

According to Theorem 1, two discrete closed curves in the complex plane can be regarded as similar if and only if the cyclic cross-correlation or cyclic convolution of normalized versions of y and z generate a maximal magnitude of almost 1. In what follows it is assumed that there is a natural order of all points in y and z in the complex plane, i.e. there is no need to take cyclic convolutions into account.

This definition of distances in spaces of discrete closed curves works very well for all mathematically defined curves. However, in many application fields one has to deal with noisy data and more robust methods are desirable that are based on additional information regarding the structure of the underlying discrete curves. Optical character recognition and geometrically oriented pattern matching are two examples, among many others.

For that reason discrete closed curves without symmetry properties should generate cross-correlations with a pronounced peak when the shift is 0. Unfortunately, peaks are rarely extremely sharp for typical curves. For example, the cross-correlation of the character "D" in FIG. 4 is almost flat. The latter result is undesirable because of ambiguities regarding rotated versions of this curve. The goal is a clear distinction between all these rotated versions.

More precisely, let be given a discrete closed curve $d=(d_1, \ldots, d_N)$ of size N in the complex plane. Let W be an unknown complex weight function. Ideally, W is a smooth discrete closed curve itself and satisfies equations $$\langle d^k, d \rangle_W = \sum_{n=1}^{N} d_{n+k} d_n^* W_n = \delta_{k0} \text{ for } k = 1, \ldots, N \quad (24)$$

In practical situations this goal is not attainable. However, the weaker system $$\sum_{n=1}^{N} d_{n+k} d_n^* W_n = \delta_{k0} \text{ for } k = 1, \ldots, N \quad (25)$$

$$W_{k+1} - W_k = 0 \text{ for } k = 1, \ldots, N$$

where $W_{N+1}=W_1$ can be solved in the least-square sense. The new curve dW* can be normalized. The second expression expresses the idea that W should be "continuous", i.e. that differences between neighboring terms of W should be relatively small. FIG. 10C, described below, depicts the result of such an optimization routine. As desired, the cross-correlation between d and dW* avoids ambiguities regarding peaks.

A robust matching routine can be derived based on (25), as described below with reference to FIG. 10B. Let d be a given discrete and closed curve in the complex plane that is known in advance and let c be a second curve of same size that is acquired during runtime.

Figure 10B:
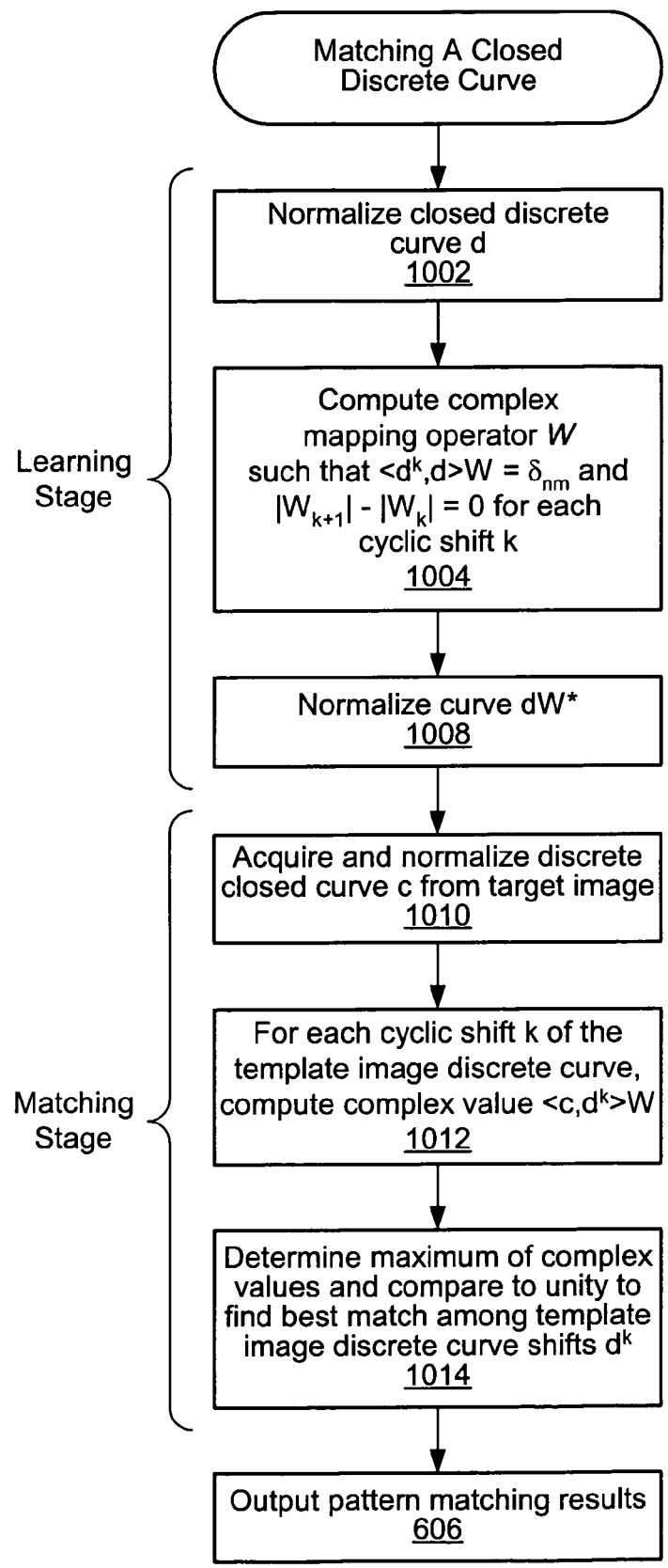
FIG. 10B is a flowchart diagram illustrating one embodiment of a method for matching a closed discrete curve.
Figure 10C:
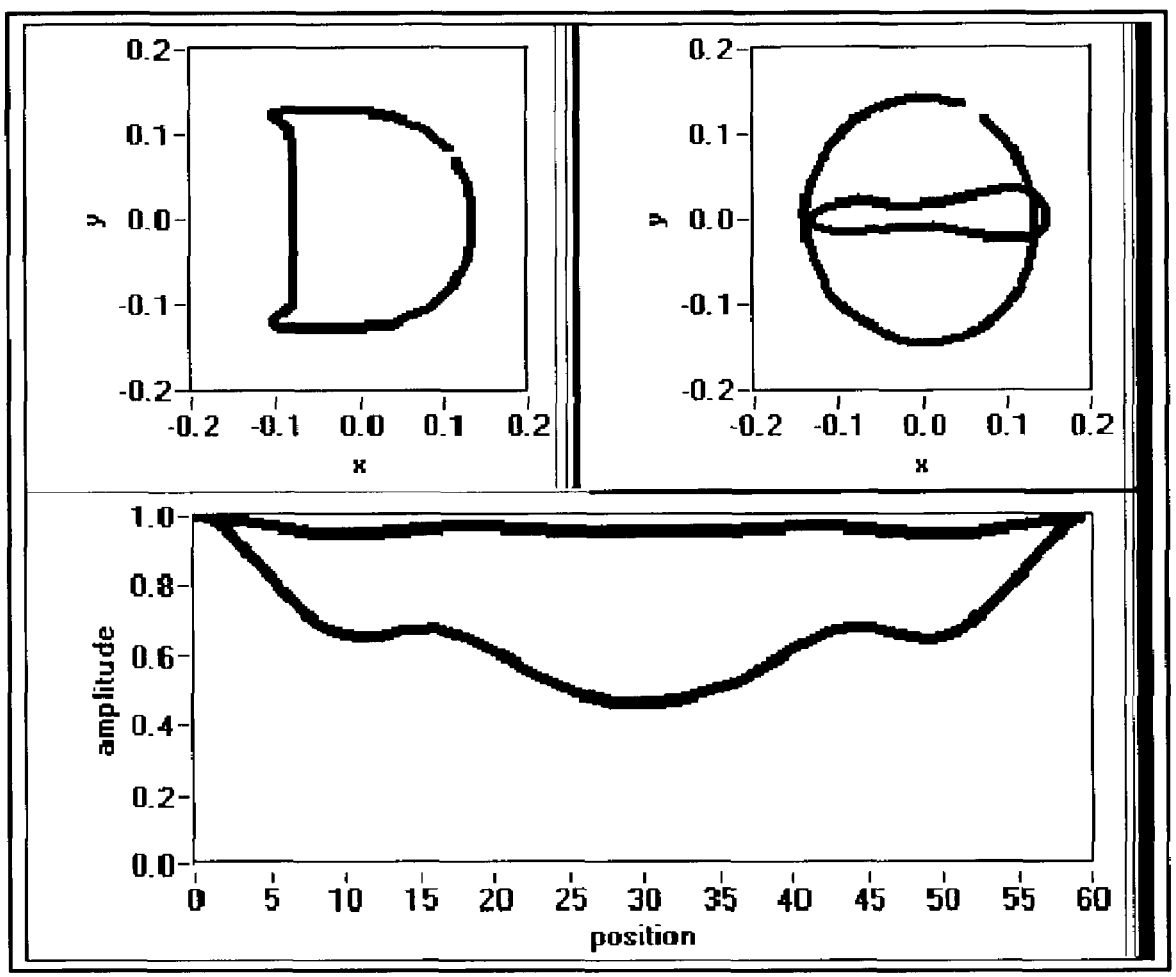
FIG. 10C illustrates correlation between a closed discrete curve and cyclic shifted version of the curve, according to one embodiment.

FIG. 10B—Matching Against a Given Discrete Closed Curve

FIG. 10B flowcharts one embodiment of a method for matching a discrete closed curve c against rotated versions of a discrete closed template curve d. As mentioned previously, in various embodiments, some of the steps shown may be performed in different order, or may be omitted, as desired. Additional steps may also be performed.

As FIG. 10B shows, in 1002, a discrete closed curve d may be normalized, as described above. Then, in 1004, a complex mapping operator W may be computed such that equations (24) and (25) hold.

In 1008, the curve dW* may be normalized. In other words, once the complex mapping operator W is computed in 1004, the complex conjugate of W may be applied to the curve d and the resulting curve normalized.

In 1010, a target discrete closed curve c may be acquired and normalized, e.g., as described above. Then, in 1012, for each cyclic shift of the curve d, the complex number $<c,d^k>_w$ may be calculated, i.e., $<c,d^k>_w$ for k=0, . . . , N−1. It should be noted that cyclically permuting c rather than d gives the same results, and is equivalent.

Then, in 1014, the maximum of the complex values computed in 1012 may be determined and compared to unity to determine the best match among the template image discrete curve cyclic shifts $d^k$. The comparison of the best match to unity is useful in that in general, the match is acceptable if and only if the corresponding magnitude is close to 1 in value. The particular cyclic shift k of the best match indicates the angle of rotation.

Finally, in 606, the pattern matching results, e.g., the best match, may be output, as described above.

Thus, the method "orthogonalizes" the given closed curve. In other words the original curve is as "orthogonal" to all rotated versions as possible. This enables the method to decide (a) whether two closed curves match and (b) determine the angle of rotation reliably. Thus, an embodiment of the method of FIG. 9B may be applied to discrete closed curves, where the plurality of discrete curves $c_1, \ldots, c_M$ comprise rotated versions of the discrete curve d.

FIG. 10C—Example of Closed Curve Matching

FIG. 10C illustrates an example of discrete closed curve matching, as performed by the method of FIG. 10B, described above. In FIG. 10C, the character "D" (left) is translated into a new closed curve (right) where the correlation between this curve and all cyclically shifted versions of the original curve shows a pronounced peak when the shift is zero. The curves are left open intentionally to depict the one-to-one correspondence between them.

One can even give up the requirement that W is a weight function, i.e. the optimization problem can be reformulated as $$\sum_{n=1}^{N} d_{n+k} W_n = \delta_{kO} \text{ for } k = 1, \ldots, N \qquad (26)$$

$$W_{k+1} - W_k = 0 \text{ for } k = 1, \ldots, N \text{ where } W_{N+1} = W_1$$

The approach (26), though more general, may be numerically less robust than (25). Thus, in preferred embodiments of the present invention, the use of (25) is preferred to that of (26).

The generalization of the method of FIG. 10B to the case of multiple discrete closed curves may be made as follows. As before, closed curves $c_i$ (i=1, \ldots, M) can be regarded as point sets in the complex plane. Let $c_i$ be normalized, i.e. the mean value equals zero, and the sum of lengths of all complex numbers in $c_i$ equals to 1. Let $$\langle c_n^i, c_m^j \rangle_W = \sum_{k=1}^{N} c_{n,i+k} c_{m,j+k}^* W_k \qquad (27)$$

denote the weighted scalar product of closed curves $c_n$ and $c_m$, where the former is cyclically shifted by i and the latter by j. The unknowns $W_1, \ldots, W_N$ are non-negative real numbers (composing the mapping operator). To improve the quality of the matching procedure, it is desirable that the following identities hold true.

$$\langle c_n^i, c_m^j \rangle_W = \delta_{n+i,m+j} \qquad (28)$$

In practical applications (28) cannot be achieved exactly. Equation (28) may be replaced with the following weaker optimization problem.

$$\sum_{\substack{n \neq m \\ j=1, \ldots, N}} |\langle c_n^0, c_m^0 \rangle_W|^2 = \min! \qquad (29)$$

$$\langle c_n^0, c_m^0 \rangle_W = 1 \text{ for } n = 1, \ldots, M$$

$$W_1, \ldots, W_N \geq 0$$

It can be shown that (29) results in an optimization problem of the form $$W^T C W = \min!$$

$$AW = b$$

$$W_1, \ldots, W_N \geq 0 \qquad (30)$$

where the matrix C is square, symmetric, and positive definite. It may be shown that $b = (1, \ldots, 1)^T$, A is a square real matrix with positive entries, where the rows are normalized in the sum-of-squares sense. It follows that $W = (1, \ldots, 1)^T$ is a first feasible solution. Again, efficients algorithms for (30) exist, e.g. Active Set Method or Hildreth-d'Esopo Algorithm (e.g. Bronshtein and Semendyayev [1997]).

Figure 11:
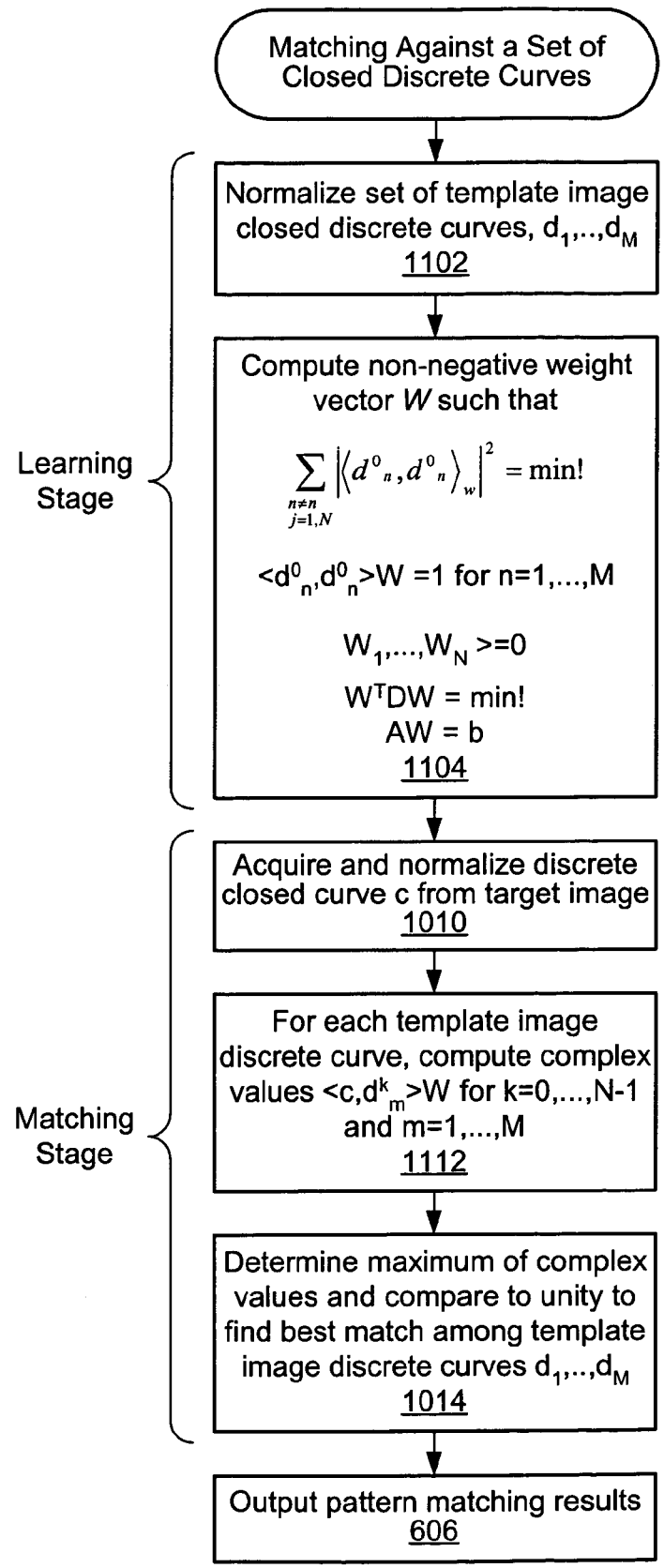
FIG. 11 is a flowchart diagram illustrating one embodiment of a method for matching against a set of closed discrete curves.

FIG. 11—Matching Against a Set of Discrete Closed Curves

FIG. 11 is a flowchart of one embodiment of a method for matching a target curve against a set of discrete closed curves. The method of FIG. 11 is similar to that of FIG. 10B, but matches against a plurality of template discrete closed curves (and their cyclic shifts), as opposed to a single template curve (and its cyclic shifts). As mentioned previously, in various embodiments, some of the steps shown may be performed in different order, or may be omitted, as desired. Additional steps may also be performed.

As FIG. 11 shows, in 1102, each of a set of discrete closed curves $d_1, \ldots d_M$ may be normalized, as described above.

Then, in 1104, using the normalized set of discrete closed curves, a non-negative mapping operator w may be computed such that equations (29) and (30) hold. In other words, w satisfies:

$$\sum_{\substack{n \neq m \\ j=1, \ldots, N}} |\langle d_n^0, d_n^0 \rangle_W|^2 = \min! \qquad (29)$$

$$\langle d_n^0, d_n^0 \rangle_W = 1 \text{ for } n = 1, \ldots, M$$

$$W_1, \ldots, W_N \geq 0$$

and $$W^T D W = \min!$$

$$AW = b$$

$$W_1, \ldots, W_N \geq 0 \qquad (30)$$

In 1010, a target discrete closed curve c may be acquired and normalized, e.g., as described above.

Then, in 1012, for each template discrete closed curve d, the complex number $\langle c, d^k \rangle_w$ may be calculated for each cyclic shift of the respective curve d, i.e., $<c,d_m^k>_w$ for k= 0, ..., N−1, m=1, ... M. As noted above, an equivalent calculation is $<c^k,d_m>_w$ for k=0, ..., N−1, m=1, ... M, where curve c is cyclically shifted, rather than $d_m$.

Then, in 1014, the maximum of the complex values computed in 1012 may be determined and compared to unity to determine the best match among the template image discrete curve cyclic shifts $d^k$ for each curve $d_m$. The match is acceptable if and only if the corresponding magnitude is close to 1 in value. The particular cyclic shift k of the best match curve indicates the angle of rotation between curve c and the optimal match $d^k_m$.

Finally, in 606, the pattern matching results, e.g., the best match, may be output, as described above.

Closed Curve Descriptors in 3D

In some applications, it may be desirable to analyze and match higher dimensional curves, for example, 3-dimensional curves. The following describes an approach for matching rotated versions of a 3D curve.

Let $y=(y_1, \ldots, y_N)$ and $z=(z_1, \ldots, z_N)$ be two discrete closed curves in $R^3$, i.e., in real-valued 3D space. Let y and z be normalized, i.e.

$$\sum_{n=1}^{N} y_n = \sum_{n=1}^{N} z_n = 0 \text{ and } \sum_{n=1}^{N} |y_n|^2 = \sum_{n=1}^{N} |z_n|^2 = 1$$

Let the 3D curve z be a rotated version of y. For mathematical reasons, the rotation angle between the two curves is required to be somewhat larger than zero, i.e., the algorithm is not applicable for small rotations. However, this is not problematic because one can easily check whether y and z are identical beforehand.

A fast method for generating the underlying rotation is desired. To this end let q be the axis of rotation and τ be the angle of rotation about this axis q. The vector q is perpendicular to all vectors $y_n-z_n$. Moreover, q is parallel to all of the vectors $(y_{n+1}-z_{n+1}) \times (y_n-z_n)$, i.e. (31) provides a good estimate for the axis of rotation q.

$$q = \frac{\sum_{n=1}^{N}(y_{n+1}-z_{n+1}) \times (y_n-z_n)}{\left|\sum_{n=1}^{N}(y_{n+1}-z_{n+1}) \times (y_n-z_n)\right|} \quad (31)$$

Assume q=(0,0,1) In a second step it will be shown how to reduce the case of a general vector q to this specific situation.

In case of q=(0,0,1) the matching process in 3D can be translated into two separate routines in the complex plane C, and on the real number line, R. To this end, a 3D vector may be split into components as follows:

$$(y_{n,1}, y_{n,2}, y_{n,3}) \to (y_{n,1}+iy_{n,2}) \text{ and } (y_{n,3})$$

$$(z_{n,1}, z_{n,2}, z_{n,3}) \to (z_{n,1}+iz_{n,2}) \text{ and } (z_{n,3})$$

The center of each of these objects is 0, but they are not normalized. Using the matching strategies in C and R it follows that:

$$\left|\sum_{n=1}^{N}(y_{n,1}+iy_{n,2})(z_{n,1}-iz_{n,2})\right| + \left|\sum_{n=1}^{N} y_{n,3} z_{n,3}\right| \leq \quad (32)$$

$$\sqrt{\sum_{n=1}^{N}(y_{n,1}^2+y_{n,2}^2)\sum_{n=1}^{N}(z_{n,1}^2+z_{n,2}^2)} + \sqrt{\sum_{n=1}^{N} y_{n,3}^2 \sum_{n=1}^{N} z_{n,3}^2} =$$

$$\sqrt{\left(1-\sum_{n=1}^{N} y_{n,3}^2\right)\left(1-\sum_{n=1}^{N} z_{n,3}^2\right)} + \sqrt{\sum_{n=1}^{N} y_{n,3}^2 \sum_{n=1}^{N} z_{n,3}^2} \leq 1$$

In (32) all the terms are equal if and only if for all n it is the case that:

$$y_{n,1}+iy_{n,2}=e^{i\tau}(z_{n,1}+iz_{n,2})$$

$$y_{n,3}=z_{n,3} \quad (33)$$

where τ is a fixed real number.

Equations (32) and (33) can be interpreted as a distance measure between y and z where all rotations are valid operations. The curves y and z have distance 0 if and only if the projection curves in C and R have this property.

Arbitrary unit vectors $q=(q_1,q_2,q_3)$ in (31) can be treated in the following way:

The matrix $$Q = \begin{pmatrix} \frac{-q_2}{\sqrt{q_1^2+q_1^2}} & \frac{q_1}{\sqrt{q_1^2+q_2^2}} & 0 \\ \frac{q_1 q_3}{\sqrt{q_1^2+q_2^2}} & \frac{q_2 q_3}{\sqrt{q_1^2+q_2^2}} & \frac{-q_1^2-q_2^2}{\sqrt{q_1^2+q_2^2}} \\ q_1 & q_2 & q_3 \end{pmatrix} \quad (34)$$

is orthogonal and maps q onto (0,0,1). In other words, it is sufficient to determine the distance between the curves $Qy_1, \ldots, Qy_N$ and $Qz_1, \ldots, Qz_N$. According to (31) the new q is identical to (0,0,1).

Figure 12A:
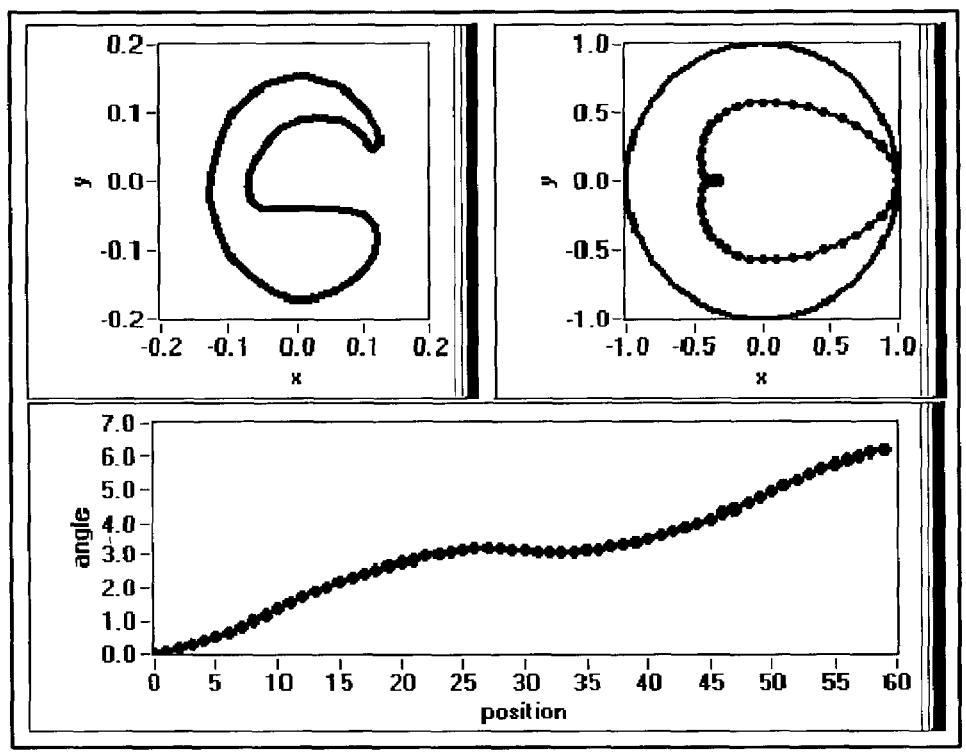
FIG. 12A illustrates correlation between a closed discrete curve and cyclic shifted version of the curve, according to another embodiment.
Figure 12B:
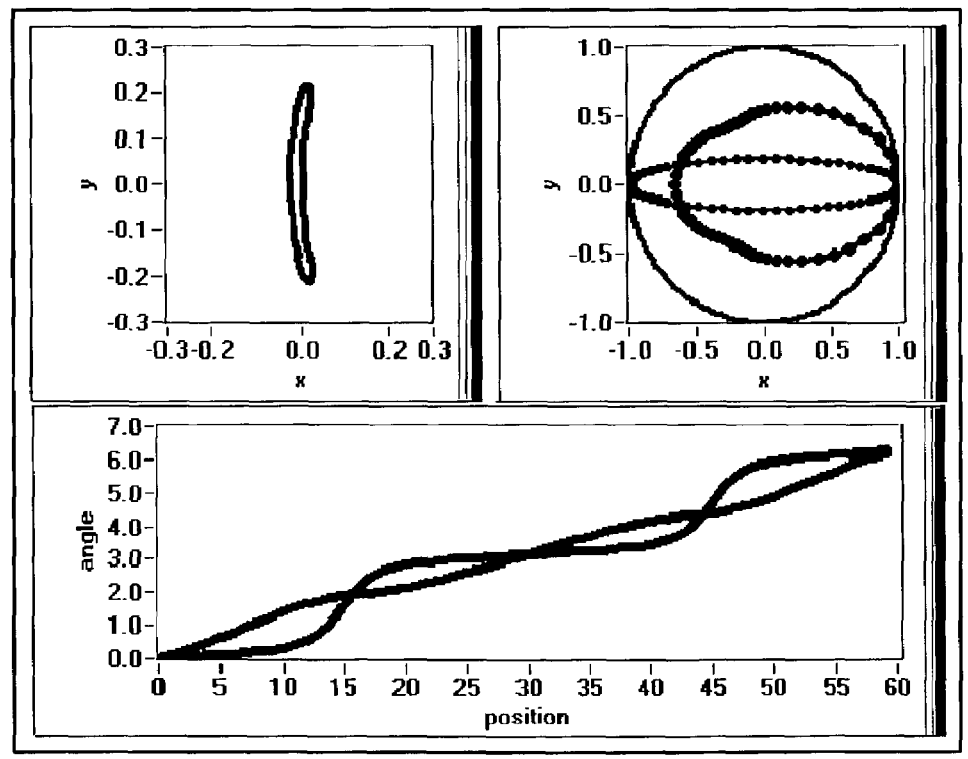
FIG. 12B illustrates correlation between a closed discrete curve and cyclic shifted version of the curve with linearization of angles, according to another embodiment.

FIGS. 12A and 12B—Numerical Improvements and Alternatives

A number of possible improvements may be considered for some embodiments of the above described methods. For example, for performance reasons it may be desirable to replace the computation of full cross-correlation according to (25) with faster methods. Two such approaches are illustrated in FIGS. 12A and 12B, described below.

FIG. 12A—Scalar Product as Cross-Correlation Replacement

In some applications, one can further manipulate weight functions in such a way that there is no need to compute a full cross-correlation. In fact, the calculation of one scalar product may be enough to generate a valid estimate for the best possible match. To achieve this goal the correct match may be encoded as phase information. FIG. 12A illustrates the replacement of a full cross-correlation calculation for a curve with a simple scalar product.

Consider:

$$\sum_{n=1}^{N} d_{n+k} d_n^* W_n = f_n \exp(2\pi i k/N) \text{ for } k = 1, \ldots, N$$

$$W_{n+1} - W_n = 0 \text{ for } k = 1, \ldots, N$$

The constants $f_k$ are chosen appropriately, e.g. 1 for k close to 1 and 0.5 for all the other k.

FIG. 12B—Scalar Product as Cross-Correlation Replacement Using Linearization of Angle FIG. 12B illustrates a further development of the approach of FIG. 12A. A linearized angle may increase the accuracy of such a prediction, in that an estimate will likely not be too far from the mark if the angle function is linear, i.e., has no flat regions. More specifically, the linearization of angles may generate a one-to-one correspondence between angle of rotation and scalar product, and thus, the scalar product may be used to determine the angle of rotation between two rotated versions of a curve.

Sub-Angle Accuracy

In some applications, it may be desirable to estimate small angular shifts between curves. The following describes one approach to that end.

Given a smooth continuous closed curve y and a second smooth curve z in the complex plane of the same length (without loss of generality, let the length be 1) such that y and z almost match, and where the mismatch is entirely based on slight shifts between y and z. In other words, $$z(\tau) = y(\tau + \alpha)$$

where $\alpha$ is a small but unknown real number and $\tau$ is the arc-length. To estimate $\alpha$, the term $$\Phi(\alpha) = \int_0^1 d\tau [z(\tau) - (y(\tau) + \alpha y'(\tau))][z(\tau) - (y(\tau) + \alpha y'(\tau))]^*$$

may be minimized, which results in $$\alpha = \frac{\Re\left(\int_0^1 d\tau [z(\tau) - y(\tau)] y'(\tau)^*\right)}{\int_0^1 d\tau |y'(\tau)|^2} \quad (35)$$

where $\Re$ denotes the real-valued portion of the expression. Formula (35) can be translated directly into expressions valid for discrete closed curves $y=(y_1, \ldots, y_N)$ and $z=(z_1, \ldots, z_N)$ where the latter is a slightly shifted version of the former. Assume both curves were sampled equidistantly. The discrete version of the estimate (35) is $$\alpha = \frac{\Re\left(\sum_{n=1}^{N} (z_n - y_n)(y_{n+1} - y_n)^*\right)}{\sum_{n=1}^{N} |(y_{n+1} - y_n)|^2} \quad (36)$$

In (36) the value of $\alpha$ is normalized with respect to the index, i.e. a value of 1 represents a shift of exactly 1 index point.

Figure 13:
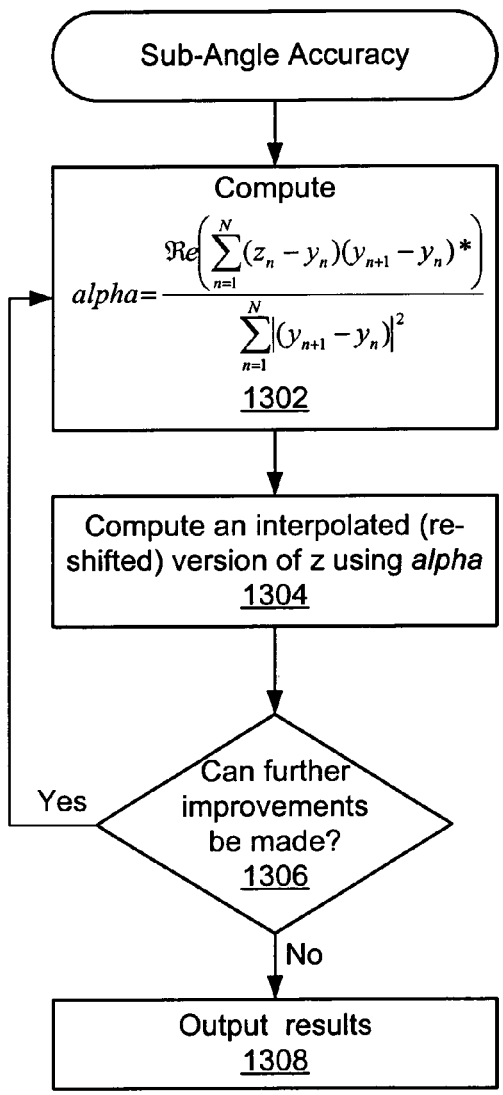
FIG. 13 is a flowchart diagram illustrating one embodiment of a method for estimating sub-angle accuracy in slightly shifted curves.

FIG. 13—Method For Determining Sub-Angle Accuracy

FIG. 13 flowcharts one embodiment of a method for estimating a small shift $\alpha$ between two curves and using the estimate to improve the match between the curves.

As FIG. 13 shows, in 1302, $\alpha$ may be computed according to equation 36.

Then, in 1304, an interpolated (re-shifted) version of z may be calculated using the computed value of $\alpha$.

In 1306, a determination may be made as to whether further improvements may be made. If further improvements may be made, then the method returns to 1302, and calculates a new value of $\alpha$ using the interpolated (re-shifted) version of z. If no further improvements may be made, then the results may be output, as indicated in 1308.

Is should be noted that equations (35), (36), and the method of FIG. 13 may be generalized to the case of spatial curves, as well.

Figure 14A:
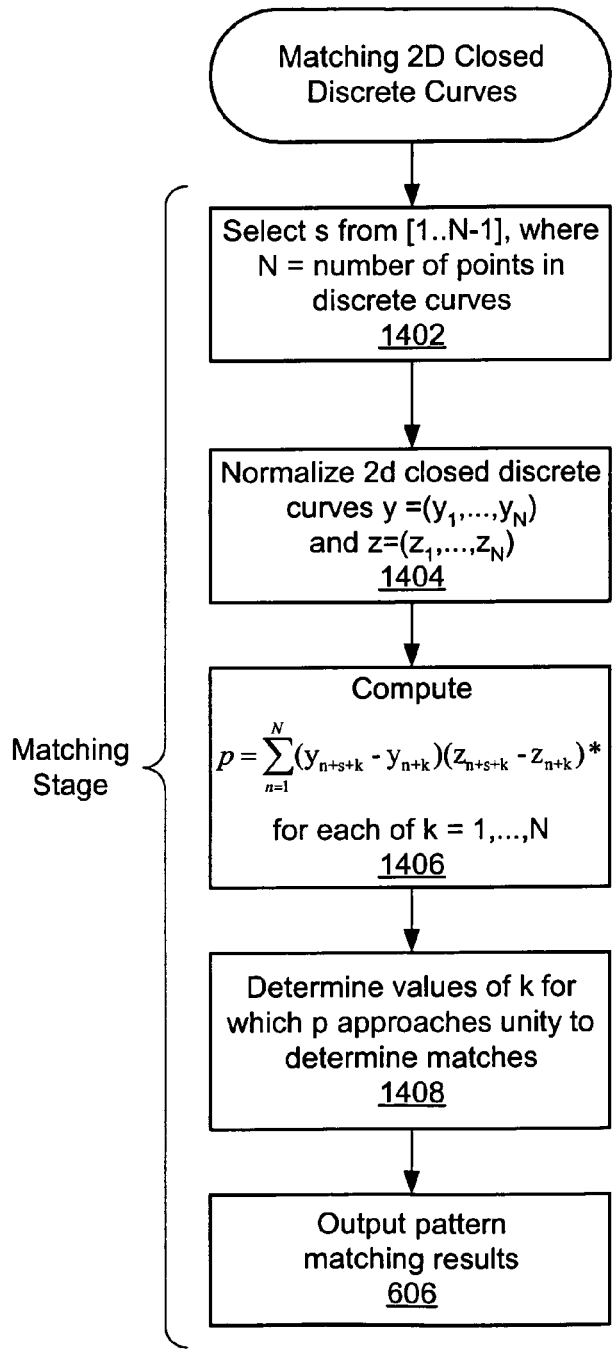
FIG. 14A is a flowchart diagram illustrating one embodiment of a method for matching 2D closed discrete curves.
Figure 14B:
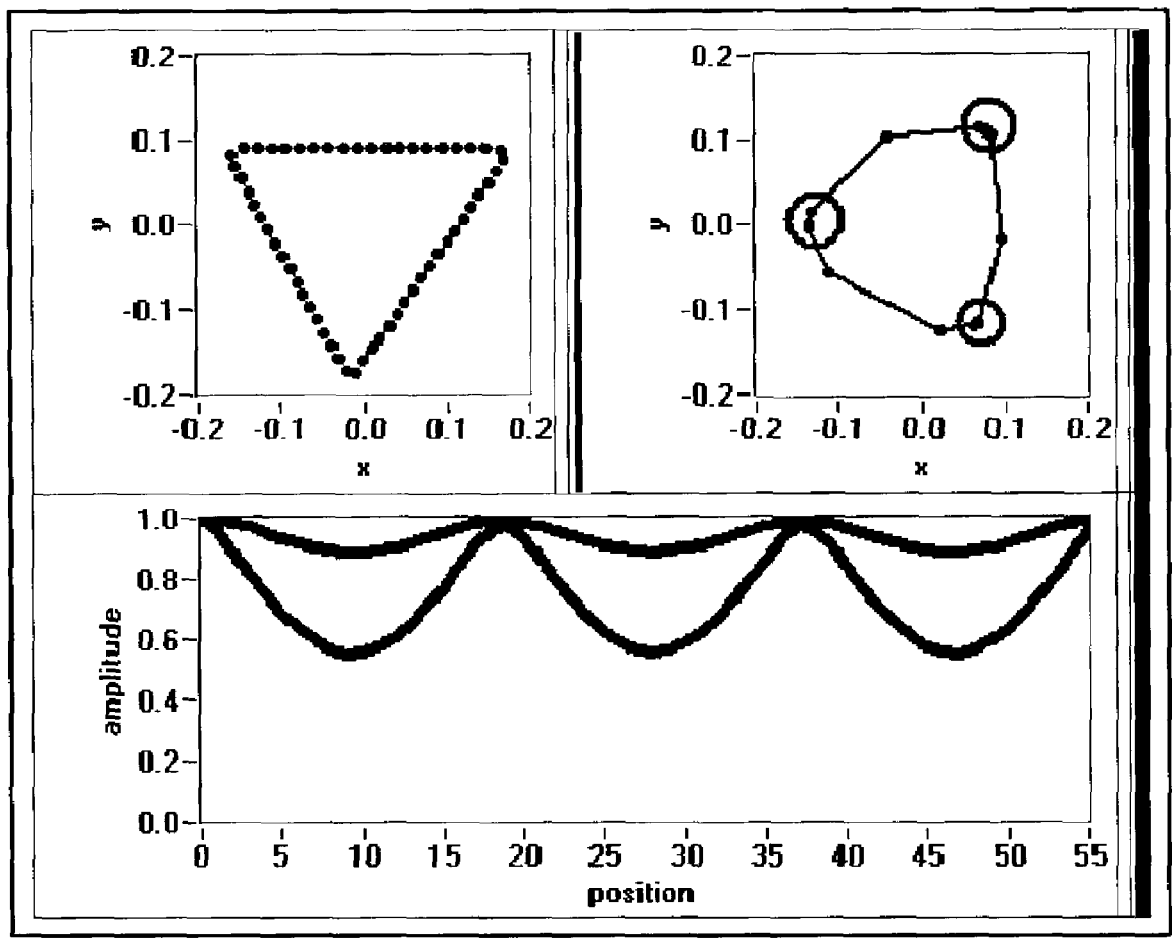
FIG. 14B illustrates correlation between a 2D closed discrete curve and cyclic shifted version of the curve using the method of FIG. 14A, according to another embodiment.

FIGS. 14A and 14B—Alternative 2D Matching Method

Let $y=(y_1, \ldots, y_N)$ and $z=(z_1, \ldots, z_N)$ be two discrete closed curves in the complex plane. Let s be a fixed natural number. Generally, s will have a value of 1, however, in various embodiments, other choices are possible and even desirable from a numerical standpoint. Let y and z be normalized in the following sense:

$$\sum_{n=1}^{N} |y_{n+s} - y_n|^2 = \sum_{n=1}^{N} |z_{n+s} - z_n|^2 = 1 \quad (37)$$

where the index notation is understood cyclically. It is the case that $$\sum_{n=1}^{N} (y_{n+s} - y_n) = \sum_{n=1}^{N} (z_{n+s} - z_n) = 0$$

In (38) a complex number is defined where the magnitude is less than 1 unless z is an exact rotated version of y.

$$\sum_{n=1}^{N} (y_{n+s} - y_n)(z_{n+s} - z_n)^* \quad (38)$$

(38) generates a new class of curve matching algorithms. Theorem 1, described above, uses complex vectors y and z to match discrete closed curves. According to (38) many other approaches are valid and may offer numerical advantages. In particular, the choice s=N/2 may reduce the computational load in cases where the y- and z-components are equally distributed.

The following method matches two discrete closed planar curves y and z of size N in the complex plane where shift, scaling, and rotation are valid operations.

FIG. 14A—Matching 2D Discrete Curves

FIG. 14A flowcharts one embodiment of a method for matching two 2D discrete curves, y and z. As noted above, in various embodiments, some of the steps may be performed in a different order than shown, or may be omitted. Additional steps may also be performed.

As FIG. 14A shows, in 1402, an appropriate natural number s may be selected from [1. . . N–1], where N is equal to the (desired) length or number of points in the discrete curves, y and z.

In 1404, the two discrete curves, y and z, may be normalized, in accordance with equation (37) above. In other words, the normalized curves have N 2D points, and the lengths satisfy equation (37).

In 1406, all complex numbers $$\sum_{n=1}^{N}(y_{n+s+k} - y_{n+k})(z_{n+s} - z_n)^*$$

may be calculated for k=1, . . . , N.

In 1408, the values of k for which p approaches unity may be determined to indicate matches. In other words, if any of the calculated complex numbers has a magnitude close to 1, a match has been found.

Finally, in 606, the pattern match results may be output.

FIG. 14B—Illustration of 2D Curve Matching

FIG. 14B illustrates the results of applying the method of FIG. 14A to a specific closed curve. The triangle's cross-correlation (upper curve of the lower graph) is less robust than the new one (lower curve) resulting from the method of FIG. 14A. In this case, s=1. The circles in the upper right part of FIG. 14B mark cluster points of the new representation of the triangle. These cluster points represent the sides of the triangle. For small s the use of filter operations applied to the original closed curve is recommended. It is noted that all points of the new curve are connected by lines, and that the points have an almost constant distance from the center.

It may also be possible to apply schemes used in (25) and the method of FIG. 9B to further improve the quality of matching results. In this case the similarity measure (38) must be replaced with more general measures such as $$\sum_{i=1}^{N}(y_{i+s} - y_i)(z_{i+s} - z_i)^* W_i$$

where W is a complex weight function.

A second method may be based on the simple observation that $(y_1 y^*_1, \ldots, y_N y^*_N)$ and $(z_1 z^*_1, \ldots, z_N z^*_N)$ can be regarded as real-valued versions of the original discrete and normalized curves y and z (sum of norms is equal to 1). In other words, matching of discrete curves in the complex plane can be translated into matching of discrete curves in the real number line. The latter is faster and an implementation is more straightforward. This approach is valid because of the following observation. A perfect matching of $(y_1 y^*_1, \ldots, y_N y^*_N)$ and $(z_1 z^*_1, \ldots, z_N z^*_N)$ is achievable, if and only if these two sequences are exactly the same. Furthermore, the discrete curves y and z are equally sampled and have the same orientation in the complex plane. It therefore follows that the discrete curves y and z coincide in the complex plane.

Figure 15:
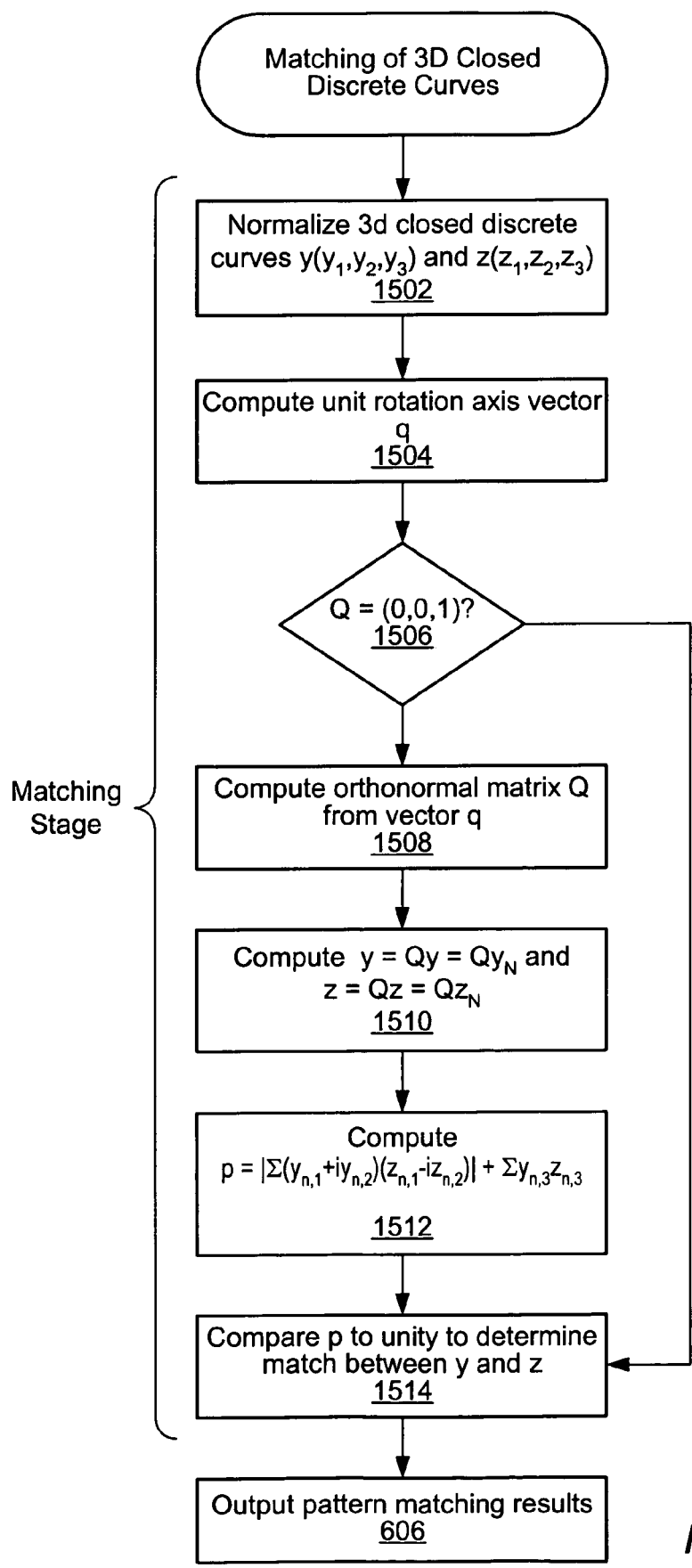
FIG. 15 is a flowchart diagram illustrating one embodiment of a method for matching 3D closed discrete curves.

FIG. 15—Matching 3D Closed Curves

FIG. 15 is a flowchart of one embodiment of a method for matching 3D discrete closed curves. More specifically, the method matches two discrete closed spatial curves y and z of size N where shift, scaling, and rotation are valid operations. As previously stated, in various embodiments, some of the steps may be performed in a different order than shown, or may be omitted, as desired. Additional steps may also be performed.

As FIG. 15 shows, in 1502, two 3D closed discrete curves, y and z, may be normalized, using any of the normalization schemes mentioned above. After normalization, each curve is of length N. It should be noted that in one embodiment, a determination may be made as to whether y and z are identical (or almost a match) before proceeding with the method because, as mentioned above, the algorithm is not reliable for small or zero angles of rotation. If the curves do not already match (or almost match), then the method continues.

A unit rotation axis vector q may then be computed based on equation (31), as indicated in 1504. Then, in 1506, a determination may be made as to whether q=(0,0,1), i.e., whether q is equal to the z-axis. If q=(0,0,1), then the method continues with step 1514 below.

If q is not equal to (0,0,1), then an orthonormal matrix Q may be computed based on q, in accordance with equation (34), as indicated by 1508. Then, in 1510, y (or y')=Qy and z=Qz may be computed. In other words, each curve may be multiplied by the matrix Q.

In 1512, the expression:

$$p = \left| \sum_{n=1}^{N}(y_{n,1} + iy_{n,2})(z_{n,1} - iz_{n,2}) \right| + \sum_{n=1}^{N} y_{n,3} z_{n,3}$$

may be calculated where n refers to a particular point in the curve, and the second subscripts indicate the first, second, and third components of the data point, i.e., the x, y, and z components.

In 1514, the value of p computed in 1512 may be compared to unity to determine whether the curves y and z match, where y and z match if and only if p is close to 1.

Finally, in 606, the pattern matching results may be output, as described above. It should be noted that if one is to perform matching between y and all cyclically shifted versions of z (or between z and all cyclically shifted versions of y), the above steps must be performed N times.

Applications

Two typical applications related to machine vision that may be successfully solved with methods described herein are now described.

Geometric Pattern Matching Based on Edges

In geometric pattern matching, e.g., discrete curve matching, a known template may be characterized geometrically (based on shape). It is common to use edge information. From a real-time prospective, the so-called learning phase is less demanding and lists of efficient descriptors of detected curves can be built up carefully. During the matching process itself the template may be searched for in a continuous (real-time) stream of images. In many cases the actual template is a shifted, rotated, and/or scaled version of the original template.

Optical Character Recognition (OCR)

Various embodiments of the method presented herein are particularly suited for optical character recognition. More specifically, the mapping of standard alphanumeric characters to forms more easily discriminated using a computed weighting function or mapping operator may greatly improve the reliability of OCR, such as may be used in optical scanners and reading machines for the visually impaired, among others applications.

Note: A White Paper titled "Efficient Matching of Discrete Curves" by Lothar Wenzel is included at the end of this document as Appendix A.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for determining a mapping operator for use in a pattern matching application, the method comprising:
receiving first information regarding an object of interest, the first information comprising a template data set containing the object of interest;
determining a template discrete curve from the template data set, wherein the template discrete curve corresponds to the object of interest in the template data set;
receiving second information regarding objects that may appear with the object of interest in an acquired target data set, the second information comprising one or more example target data sets;
determining at least one parameter for a mapping operator based on the first information and the second information; and
configuring the mapping operator according to the determined at least one parameter,
wherein said determining and said configuring comprise:
analyzing the one or more example target data sets to determine one or more example target discrete curves, wherein each of the one or more example target discrete curves corresponds to a data object or part of a data object in the one or more example target data sets;
determining the mapping operator based on the determined template discrete curve and the one or more example target discrete curves, wherein said determining the mapping operator comprises:
normalizing the template discrete curve and the one or more example target discrete curves; and
computing a weight vector W, such that $$\langle c_n, c_m \rangle_{W_m} = \sum_{i=1}^{N} c_{ni} c_{mi}^* W_i = \delta_{nm}$$

wherein $c_m$ comprises the normalized template discrete curve, wherein $c_n$ comprises any one of the one or more normalized example target discrete curves, and wherein $\delta_{nm}$ is the Kronecker delta;
storing the mapping operator in a memory; and
mapping the template discrete curve to a mapped template discrete curve using the mapping operator;
wherein the mapped template discrete curve is useable to perform pattern matching to locate instances of the object of interest in an acquired target data set.

2. The method of claim 1,
wherein the mapping operator is operable to be used in a pattern matching application to locate instances of the object of interest in the acquired target data set.

3. The method of claim 1,
wherein the at least one parameter is configurable for different objects of interest.

4. The method of claim 1,
wherein the at least one parameter is configurable to enhance differences for respective objects of interest and objects not of interest.

5. The method of claim 1,
wherein the mapping operator comprises a weight vector;
wherein the at least one parameter comprises one or more terms in the weight vector; and
wherein the one or more terms are configurable for different objects of interest.

6. The method of claim 5,
wherein the one or more terms are configurable to enhance differences for respective objects of interest and objects not of interest.

7. The method of claim 1,
wherein the mapping operator is operable to be applied to information corresponding to objects to map the information to new information, wherein the new information operates to emphasize differences between respective objects.

8. The method of claim 1,
wherein the second information describes objects not of interest in the pattern matching application; and
wherein the mapping operator is operable to be applied to information corresponding to objects to map the information to new information, wherein the new information operates to emphasize differences between the object of interest and the objects not of interest.

9. The method of claim 1,
wherein the mapping operator is useable to map a template discrete curve characterizing the object of interest to a mapped template discrete curve using the mapping operator; and
wherein the mapped template discrete curve is useable to perform pattern matching to locate instances of the object of interest in an acquired target data set.

10. The method of claim 9,
wherein the at least one parameter is used to create a distance between mapped discrete curves corresponding to the object of interest and mapped discrete curves corresponding to objects that are not of interest.

11. The method of claim 9, wherein said determining the at least one parameter for the mapping operator comprises:
determining a template discrete curve characterizing the object of interest;
determining one or more target discrete curves characterizing the objects that may appear with the object of interest in an acquired target data set; and
generating a value for the at least one parameter that enhances a difference between mappings of the template discrete curve and the one or more mapped target discrete curves.

12. The method of claim 11,
wherein the template discrete curve and the one or more target discrete curves comprise respective sequences of complex points; and
wherein the mapping operator is a complex mapping operator.

13. The method of claim 1,
wherein the first information comprises a template discrete curve characterizing the object of interest.

14. The method of claim 1,
wherein the first information is derived from a template data set containing the object of interest.

15. The method of claim 1,
wherein the second information comprises one or more discrete curves characterizing objects expected to appear in an acquired target data set containing the object of interest.

16. The method of claim 1,
wherein the second information is derived from an acquired target data set containing the object of interest.

17. The method of claim 1, further comprising:
receiving a template data set containing the object of interest;
determining the first information from the template data set;
receiving one or more target data sets containing the object of interest and one or more background data objects; and
determining the second information from the one or more target data sets.

18. The method of claim 1,
wherein the mapping operator is a weighting operator.

19. The method of claim 1,
wherein the mapped template discrete curve is a unique discrete curve generated from the template discrete curve.

20. The method of claim 1,
wherein the mapped template discrete curve is an artificially created discrete curve that is more stable under data disruptions than the template discrete curve.

21. The method of claim 1, further comprising:
acquiring a target data set;
determining at least one target discrete curve from the target data set, wherein each target discrete curve corresponds to a respective data object in the target data set;
performing curve matching on the target image discrete curve and the mapped template discrete curve corresponding to the object of interest, wherein said performing curve matching computes a distance measure for the target discrete curve relative to the mapped template discrete curve; and
generating pattern matching results based on the distance measures.

22. The method of claim 21,
wherein said determining the at least one target discrete curve from the target data set comprises:
determining at least one initial target discrete curve from the target data set; and
mapping the at least one initial target discrete curve to a respective at least one mapped target discrete curve using the mapping operator, wherein the at least one mapped target discrete curve comprises the at least one target discrete curve; and
wherein said performing curve matching on the target discrete curve and the mapped template discrete curve comprises performing curve matching on the mapped target discrete curve and the mapped template discrete curve.

23. The method of claim 22, further comprising:
repeating said acquiring, said determining at least one initial target discrete curve, said mapping the at least one initial target discrete curve, said performing and said generating for each of a plurality of additional target data sets.

24. The method of claim 1,
wherein the acquired target data set comprises an acquired target image;
wherein the object of interest comprises an image object; and
wherein the mapping operator is operable to be used in a pattern matching application to locate instances of the object of interest in the acquired target image.

25. The method of claim 24,
wherein the second information is derived from objects appearing in a background of an acquired target image containing the object of interest.

26. A memory medium which stores program instructions for determining a mapping operator for use in a pattern matching application, wherein the program instructions are executable by a processor to perform:
receiving first information regarding an object of interest, the first information comprising a template data set containing the object of interest;
determining a template discrete curve from the template data set, wherein the template discrete curve corresponds to the object of interest in the template data set;
receiving second information regarding objects that may appear with the object of interest in an acquired target data set, the second information comprising one or more example target data sets;
determining at least one parameter for a mapping operator based on the first information and the second information; and
configuring the mapping operator according to the determined at least one parameter, wherein said determining and said configuring comprise:
analyzing the one or more example target data sets to determine one or more example target discrete curves, wherein each of the one or more example target discrete curves corresponds to a data object or part of a data object in the one or more example target data sets;
determining the mapping operator based on the determined template discrete curve and the one or more example target discrete curves, wherein said determining the mapping operator comprises:
normalizing the template discrete curve and the one or more example target discrete curves; and
computing a weight vector W, such that $$\langle c_n, c_m \rangle_{W_m} = \sum_{i=1}^{N} c_{ni} c_{mi}^* W_i = \delta_{nm}$$

wherein $c_m$ comprises the normalized template discrete curve, wherein $c_n$ comprises any one of the one or more normalized example target discrete curves, and wherein $\delta_{nm}$ is the Kronecker delta;
storing the mapping operator in a memory; and
mapping the template discrete curve to a mapped template discrete curve using the mapping operator;
wherein the mapped template discrete curve is useable to perform pattern matching to locate instances of the object of interest in an acquired target data set.

27. The memory medium of claim 26,
wherein the mapping operator is operable to be used in a pattern matching application to locate instances of the object of interest in the acquired target data set.

28. The memory medium of claim 26,
wherein the at least one parameter is configurable for different objects of interest.

29. The memory medium of claim 26,
wherein the at least one parameter is configurable to enhance differences for respective objects of interest and objects not of interest.

30. The memory medium of claim 26,
wherein the mapping operator comprises a weight vector;
wherein the at least one parameter comprises one or more terms in the weight vector; and
wherein the one or more terms are configurable for different objects of interest.

31. The memory medium of claim 30,
wherein the one or more terms are configurable to enhance differences for respective objects of interest and objects not of interest.

32. The memory medium of claim 26,
wherein the mapping operator is operable to be applied to information corresponding to objects to map the information to new information, wherein the new information operates to emphasize differences between respective data objects.

33. The memory medium of claim 26,
wherein the second information describes objects not of interest in the pattern matching application; and
wherein the mapping operator is operable to be applied to information corresponding to objects to map the information to new information, wherein the new information operates to emphasize differences between the object of interest and the objects not of interest.

34. The memory medium of claim 26,
wherein the mapping operator is useable to map a template discrete curve characterizing the object of interest to a mapped template discrete curve using the mapping operator; and
wherein the mapped template discrete curve is useable to perform pattern matching to locate instances of the object of interest in an acquired target data set.

35. The memory medium of claim 34,
wherein the at least one parameter is used to create a distance between mapped discrete curves corresponding to the object of interest and mapped discrete curves corresponding to objects that are not of interest.

36. The memory medium of claim 34, wherein said determining the at least one parameter for the mapping operator comprises:
determining a template discrete curve characterizing the object of interest;
determining one or more target discrete curves characterizing the objects that may appear with the object of interest in an acquired target data set; and
generating a value for the at least one parameter that enhances a difference between mappings of the template discrete curve and the one or more mapped target discrete curves.

37. The memory medium of claim 36,
wherein the template discrete curve and the one or more target discrete curves comprise respective sequences of complex points; and
wherein the mapping operator is a complex mapping operator.

38. The memory medium of claim 26,
wherein the first information comprises a template discrete curve characterizing the object of interest.

39. The memory medium of claim 26,
wherein the first information is derived from a template data set containing the object of interest.

40. The memory medium of claim 26,
wherein the second information comprises one or more discrete curves characterizing objects expected to appear in an acquired target data set containing the object of interest.

41. The memory medium of claim 26,
wherein the second information is derived from an acquired target data set containing the object of interest.

42. The memory medium of claim 26,
wherein the second information is derived from objects appearing in a background of an acquired target data set containing the object of interest.

43. The memory medium of claim 26, wherein the program instructions are further executable to perform:
receiving a template data set containing the object of interest;
determining the first information from the template data set;
receiving one or more target data sets containing the object of interest and one or more background data objects; and
determining the second information from the target data set.

44. The memory medium of claim 26,
wherein the mapping operator is a weighting operator.

45. The memory medium of claim 26,
wherein the mapped template discrete curve is a unique discrete curve generated from the template discrete curve.

46. The memory medium of claim 26,
wherein the mapped template discrete curve is an artificially created discrete curve that is more stable under data disruptions than the template discrete curve.

47. The memory medium of claim 26, wherein the program instructions are further executable to perform:
acquiring a target data set;
determining at least one target discrete curve from the target data set, wherein each target discrete curve corresponds to a respective data object in the target data set;
mapping the at least one target discrete curve to a respective at least one mapped target discrete curve using the mapping operator;
performing curve matching on the mapped target discrete curve and the mapped template discrete curve corresponding to the object of interest, wherein said performing curve matching computes a distance measure for the mapped target discrete curve relative to the mapped template discrete curve; and
generating pattern matching results based on the distance measures.

48. The memory medium of claim 26, wherein the program instructions are further executable to perform:
repeating said acquiring, said determining, said mapping, said performing and said generating for each of a plurality of additional target data sets.

49. A method for determining a mapping operator for use in a curve matching application, the method comprising:
receiving first information regarding an object of interest, the first information comprising a template data set containing the object of interest;
determining a template discrete curve from the template data set, wherein the template discrete curve corresponds to the object of interest in the template data set;

receiving second information regarding objects that may appear with the object of interest in acquired target data sets, the second information comprising one or more example target data sets;

determining one or more mapping operators based on the first information and the second information, including:

analyzing the one or more example target data sets to determine one or more example target discrete curves, wherein each of the one or more example target discrete curves corresponds to a data object or part of a data object in the one or more example target data sets;

determining the one or more mapping operators based on the determined template discrete curve and the one or more example target discrete curves, comprising:

normalizing the template discrete curve and the one or more example target discrete curves; and for each mapping operator, computing a weight vector W, such that $$\langle c_n, c_m \rangle_{W_m} = \sum_{i=1}^{N} c_{ni} c_{mi}^* W_i = \delta_{nm}$$

wherein $c_m$ comprises the normalized template discrete curve, wherein $c_n$ comprises any one of the one or more normalized example target discrete curves, and wherein $\delta_{nm}$ is the Kronecker delta;

storing the one or more mapping operators in a memory medium;

wherein the one or more mapping operators are usable to determine the presence of the object of interest in the acquired target data sets; and mapping the template discrete curve to a mapped template discrete curve using at least one of the mapping operators;

wherein the mapped template discrete curve is useable to perform pattern matching to locate instances of the object of interest in an acquired target data set.

50. A method for determining a mapping operator for use in a curve matching application, the method comprising:

receiving information regarding two or more objects of interest, wherein the two or more objects may appear in acquired target data sets, and wherein the information comprises one or more example target data sets that include the one or more objects of interest;

determining one or more mapping operators based on the information, wherein the one or more mapping operators are operable to enhance differences between the two or more objects of interest, said determining including:

analyzing the one or more example target data sets to determine two or more example target discrete curves, wherein each of the two or more example target discrete curves corresponds to a data object or part of a data object in the one or more example target data sets; and determining the one or more mapping operators based on the two or more example target discrete curves, comprising:

normalizing the two or more example target discrete curves; and for each mapping operator, computing a weight vector W, such that $$\langle c_n, c_m \rangle_{W_m} = \sum_{i=1}^{N} c_{ni} c_{mi}^* W_i = \delta_{nm}$$

wherein $c_m$ and $c_n$ comprise any two of the two or more example target discrete curves, and wherein $\delta_{nm}$ is the Kronecker delta; and storing the one or more mapping operators in a memory medium;

wherein the one or more mapping operators are usable to determine the presence of the objects of interest in the acquired target data sets.

51. A computer readable memory medium that stores program instructions for determining a mapping operator for use in a curve matching application, wherein the program instructions are executable by a processor to perform:

receiving first information regarding an object of interest, the first information comprising a template data set containing the object of interest;

determining a template discrete curve from the template data set, wherein the template discrete curve corresponds to the object of interest in the template data set;

receiving second information regarding objects that may appear with the object of interest in acquired target data sets, the second information comprising one or more example target data sets;

determining one or more mapping operators based on the first information and the second information, including:

analyzing the one or more example target data sets to determine one or more example target discrete curves, wherein each of the one or more example target discrete curves corresponds to a data object or part of a data object in the one or more example target data sets;

determining the one or more mapping operators based on the determined template discrete curve and the one or more example target discrete curves, comprising:

normalizing the template discrete curve and the one or more example target discrete curves; and for each mapping operator, computing a weight vector W, such that $$\langle c_n, c_m \rangle_{W_m} = \sum_{i=1}^{N} c_{ni} c_{mi}^* W_i = \delta_{nm}$$

wherein $c_m$ comprises the normalized template discrete curve, and wherein $c_n$ comprises any one of the one or more normalized example target discrete curves; and wherein $\delta_{nm}$ is the Kronecker delta;

storing the one or more mapping operators in a memory medium;

wherein the one or more mapping operators are usable to determine the presence of the object of interest in the acquired target data sets; and mapping the template discrete curve to a mapped template discrete curve using the mapping operator;

wherein the mapped template discrete curve is useable to perform pattern matching to locate instances of the object of interest in an acquired target data set.

52. A computer readable memory medium that stores program instructions for determining a mapping operator for use in a curve matching application, wherein the program instructions are executable by a processor to perform:

receiving information regarding two or more objects of interest, wherein the two or more objects may appear in acquired target data sets, and wherein the information comprises one or more example target data sets that include the one or more objects of interest;

determining one or more mapping operators based on the information, wherein the one or more mapping operators are operable to enhance differences between the two or more objects of interest, said determining including:

analyzing the one or more example target data sets to determine two or more example target discrete curves, wherein each of the two or more example target discrete curves corresponds to a data object or part of a data object in the one or more example target data sets; and determining the one or more mapping operators based on the two or more example target discrete curves, comprising:

normalizing the two or more example target discrete curves; and for each mapping operator, computing a weight vector W, such that $$\langle c_n, c_m \rangle_{W_m} = \sum_{i=1}^{N} c_{ni} c_{mi}^* W_i = \delta_{nm}$$

wherein $c_m$ and $c_n$ comprise any two of the two or more example target discrete curves, and wherein $\delta_{nm}$ is the Kronecker delta; and storing the one or more mapping operators in a memory medium;

wherein the one or more mapping operators are usable to determine the presence of the objects of interest in the acquired target data sets.

* * * * *